United States Patent
Shima et al.

(10) Patent No.: US 8,926,024 B2
(45) Date of Patent: Jan. 6, 2015

(54) MOTORIZED CUTTER, MOTORIZED CUTTER WITH WHEELS, AND CUTTING METHOD

(75) Inventors: Yukihiro Shima, Hitachinaka (JP); Kenji Niwa, Hitachinaka (JP); Shinki Ohtsu, Naka (JP); Junichi Kamimura, Hitachinaka (JP); Mitsuhiro Sunaoshi, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 0 days.

(21) Appl. No.: 13/147,121

(22) PCT Filed: Jan. 29, 2010

(86) PCT No.: PCT/JP2010/000555
§ 371 (c)(1),
(2), (4) Date: Jul. 29, 2011

(87) PCT Pub. No.: WO2010/087200
PCT Pub. Date: Aug. 5, 2010

(65) Prior Publication Data
US 2011/0303060 A1 Dec. 15, 2011

(30) Foreign Application Priority Data
Jan. 29, 2009 (JP) ................................. 2009-018864

(51) Int. Cl.
*B23D 59/00* (2006.01)
*E01C 23/09* (2006.01)
*E01C 19/00* (2006.01)

(52) U.S. Cl.
CPC .......... *E01C 23/0933* (2013.01); *B23D 59/003* (2013.01); *E01C 19/006* (2013.01)
USPC ........... 299/1.5; 299/39.3; 83/520; 125/13.01

(58) Field of Classification Search
CPC .... E01C 23/0933; B27B 5/10; B23D 59/003; B23D 33/12; B28D 1/045
USPC ............... 299/1.05, 1.5, 39.3; 125/12, 13.01; 83/520, 521, 522.11–522.19, 83/522.21–522.29
See application file for complete search history.

(56) References Cited

U.S. PATENT DOCUMENTS 4,428,159 A * 1/1984 Sigetich et al. ............... 451/213
4,446,845 A * 5/1984 Harding ...................... 125/13.03
(Continued)

FOREIGN PATENT DOCUMENTS

CN 2068522 U 1/1991
CN 1137770 A 12/1996
(Continued)

OTHER PUBLICATIONS

Chinese Office Action issued in Chinese Application No. 201080005456.7 dated Mar. 21, 2013, with English Translation.

(Continued)

*Primary Examiner* — David Bagnell
*Assistant Examiner* — Michael Goodwin
(74) *Attorney, Agent, or Firm* — McDermott Will & Emery LLP

(57) ABSTRACT

The motorized cutter with wheels (10) comprises a motorized cutter (20) and a carriage (30). The motorized cutter (20) is equipped with an engine (24), a blade (22) rotatably driven by the engine (24), and a light-emitting unit (50) that generates laser light (52) in the same plane as the plane of rotation of the blade (22). A roadbed (90) is then cut along a line (X) drawn on the roadbed (90) by operating the motorized cutter with wheels (10) so that the line (X) is irradiated with the laser light (52). It is possible to remove the motorized cutter (20) from the carriage (30) together with the light-emitting unit (50).

15 Claims, 22 Drawing Sheets

(56) References Cited

U.S. PATENT DOCUMENTS

| | | | | |
|---|---|---|---|---|
| 4,885,967 | A * | 12/1989 | Bell et al. | 83/520 |
| 5,285,708 | A * | 2/1994 | Bosten et al. | 83/520 |
| 5,461,790 | A * | 10/1995 | Olstowski | 30/391 |
| 5,675,899 | A * | 10/1997 | Webb | 30/390 |
| 5,941,227 | A * | 8/1999 | Bearden | 125/13.01 |
| 6,203,112 | B1 | 3/2001 | Cook et al. | |
| 6,349,712 | B1 * | 2/2002 | Halstead | 125/12 |
| 7,096,587 | B2 * | 8/2006 | Onose et al. | 30/390 |
| 7,159,497 | B2 * | 1/2007 | Weusthof et al. | 83/520 |
| 7,168,180 | B2 * | 1/2007 | Wu et al. | 33/642 |
| 7,658,501 | B2 * | 2/2010 | Niemann | 362/89 |
| 7,926,398 | B2 * | 4/2011 | Garcia et al. | 83/520 |
| 2003/0070306 | A1 * | 4/2003 | McDonald | 30/371 |
| 2005/0217445 | A1 * | 10/2005 | Peot et al. | 83/471.3 |
| 2005/0262978 | A1 * | 12/2005 | Hetcher et al. | 83/100 |
| 2006/0111809 | A1 * | 5/2006 | Etter et al. | 700/180 |

FOREIGN PATENT DOCUMENTS

| | | |
|---|---|---|
| CN | 2561813 Y | 7/2003 |
| DE | 10 2007 018 352 A1 | 10/2008 |
| EP | 1 693 170 A1 | 8/2006 |
| JP | 01-295903 | 11/1989 |
| JP | 06-033417 | 2/1994 |
| JP | 3005894 U | 1/1995 |
| JP | 09-059918 | 3/1997 |
| JP | 11-140817 | 5/1999 |
| JP | 2006-233624 A | 9/2006 |
| JP | 2007-092368 A | 4/2007 |
| WO | WO 2007/145880 A2 | 12/2007 |
| WO | WO 2008055738 A1 * | 5/2008 |

OTHER PUBLICATIONS

Notification of Reasons for Rejection issued Mar. 18, 2013 in Japanese Patent Application No. 2009-018864 and English translation.

* cited by examiner

MOTORIZED CUTTER, MOTORIZED CUTTER WITH WHEELS, AND CUTTING METHOD

RELATED APPLICATIONS

This application is the U.S. National Phase under 35 U.S.C. §371 of International Application No. PCT/JP2010/000555, filed on Jan. 29, 2010, which in turn claims the benefit of Japanese Application No. 2009-018864, filed on Jan. 29, 2009, the disclosures of which Applications are incorporated by reference herein.

TECHNICAL FIELD

The present invention relates to a motorized cutter, a motorized cutter with wheels, and a cutting method.

BACKGROUND ART

A motorized cutter can mainly be used to cut work materials such as pipe materials, plate materials, and roadbeds made of metal, concrete, or the like by using a blade driven by an engine. When cutting using the motorized cutter, it is often necessary to push the blade against the work material along a line drawn on the work material. However, it is difficult to operate a motorized cutter while looking directly at the blade because the blade of a motorized cutter is typically covered by a protective cover. The motorized cutter disclosed in patent literature 1 is therefore provided with marks on the outer periphery of the protective cover that indicate the position and direction of the blade.

In particular, motorized cutters for cutting a roadbed have wheels for moving and a marker plate for guiding the motorized cutter along a line drawn on the roadbed. With a motorized cutter with wheels disclosed in patent literature 2, the marker plate is fitted to a guide rod extending forward in a direction of travel of the motorized cutter from the body of the motorized cutter so as to be arranged in the vicinity of the roadbed. According to such a motorized cutter with wheels, it is possible to cut a roadbed along a line drawn on the roadbed by moving the motorized cutter so that the marker plate goes along the line.

CITATION LIST

Patent Literature

[PTL 1]
Japanese Utility Model KOKAI Publication No. S63-190311
[PTL 2]
Registered Utility Model No. 3022503

SUMMARY OF INVENTION

Technical Problem

When cutting using a motorized cutter where marks are provided on the protective cover covering the blade, discrepancies can occur between the position of the blade and the position of the line unless an operator looks at the marks from an appropriate direction. Such discrepancies are inevitable because of the distance between the line drawn on the work material and the marks provided on the protective cover. It is therefore difficult to accurately align the position of the blade and the line.

When cutting using a motorized cutter with wheels having a marker plate, since the marker plate is in close proximity to the roadbed, the marker plate may become damaged as the result of direct contact with bumps in the roadbed and may no longer indicate the position accurately. Discrepancies can also occur between the blade position and the position of the line unless the operator is viewing the marker plate from an appropriate direction, as with the above-mentioned motorized cutter where marks are provided on the protective cover covering the blade. It is therefore difficult to accurately align the position of the blade and the line. Ease of storage is also hampered because the marker plate projects from the body of the motorized cutter.

In addition, there are also cases where visual confirmation of the marks or the marker plate and the line is difficult during cutting due to poor body posture or due to sparks and dust coming from the work material and the blade for conventional motorized cutters or motorized cutters with wheels. For these reasons, ease of operation of motorized cutters and motorized cutters with wheels of the related art is not sufficient, and implementation of a highly reliable cutting operation is difficult.

In order to resolve the above problems, it is an object of the present invention to provide a motorized cutter and a motorized cutter with wheels with superior ease of operation and to provide a highly-reliable cutting method.

Solution to Problem

In order to resolve the above problems, a motorized cutter of a first aspect of the present invention comprises:
an engine;
a blade, rotatably driven by the engine, for cutting a work material; and
at least one light-emitting unit for emitting laser light traveling substantially perpendicularly to a direction of an axis of rotation of the blade.

It is also possible for, for example, the motorized cutter to have a support member for supporting the light-emitting unit pivotably about an axis parallel with the axis of rotation of the blade.

For example, it is also possible for the motorized cutter to have a support member for supporting the light-emitting unit pivotably about an axis parallel with the axis of rotation of the blade and movably in parallel with the axis of rotation of the blade.

The at least one light emitting element can include a plurality of the light-emitting units emitting the laser light to the front and rear of the blade.

It is also possible for the motorized cutter to have a protective unit that covers the blade. An open section is then formed at the protective unit so as to enable the light-emitting unit to irradiate the blade with the laser light via the open section.

The protective unit can also have a cover that covers the open section.

It is also preferable for the motorized cutter to have a generator that generates electrical power from the power of the engine, with the light-emitting unit operating on the electrical power supplied by the generator.

The motorized cutter can also have, for example, a battery for storing electrical power supplied by the generator. The light-emitting unit can then operate on the electrical power supplied by the battery.

It is also possible for the motorized cutter to have:
a first sensor for detecting rotation of the engine and transmitting an engine rotation detection signal that indicates whether or not the engine is rotating; and a first control unit that controls whether the light-emitting unit is on or off in response to the engine rotation detection signal received from the first sensor.

The first control unit then puts the light-emitting unit on in response to starting of the engine and puts the light-emitting unit off in response to stopping of the engine.

It is also preferable for the motorized cutter to also have:
a tank for storing cutting fluid supplied to the blade;
a supply path for supplying the cutting fluid from the tank to the blade;
an on-off valve for opening and closing the supply path;
a second sensor for detecting rotation of the blade and transmitting a blade rotation detection signal indicating whether or not the blade is rotating; and
a second control unit for controlling whether the on-off valve is on or off in response to the blade rotation detection signal received from the second sensor.

The second control unit then puts the on-off valve on in response to starting of the blade and puts the on-off valve off in response to stopping of the blade.

In order to resolve the above problems, a motorized cutter of a second aspect of the present invention comprises:
an engine;
a blade, rotatably driven by the engine, for cutting a work material;
a detection unit for detecting a relative position of the laser light incident substantially perpendicularly to a direction of an axis of rotation of the blade with respect to the blade in the direction of the axis of rotation of the blade; and
a display unit for displaying the relative position of the laser light detected by the detection unit.

It is preferable for the motorized cutter to also have:
a tank for storing cutting fluid supplied to the blade;
a supply path for supplying the cutting fluid from the tank to the blade;
an on-off valve for opening and closing the supply path;
a second sensor for detecting rotation of the blade and transmitting a blade rotation detection signal indicating whether or not the blade is rotating; and
a second control unit for controlling whether the on-off valve is on or off in response to the blade rotation detection signal received from the second sensor.

The second control unit then puts the on-off valve on in response to starting of the blade and puts the on-off valve off in response to stopping of the blade.

In order to resolve the above problems, a motorized cutter with wheels of a third aspect of the present invention comprises:
an engine;
a blade, rotatably driven by the engine, for cutting a work material;
at least one light-emitting unit for emitting laser light traveling substantially perpendicularly to a direction of an axis of rotation of the blade; and
a carriage having a plurality of wheels.

It is also possible for the motorized cutter with wheels to have a support member for supporting the light-emitting unit pivotably about an axis parallel with the axis of rotation of the blade.

It is also possible, for example, for the motorized cutter with wheels to have a support member for supporting the light-emitting unit pivotably about an axis parallel with the axis of rotation of the blade and movably in parallel with the axis of rotation of the blade.

The at least one light emitting element can have a plurality of the light-emitting units emitting the laser light to the front and rear of the blade.

It is also possible, for example, for the motorized cutter with wheels to have a protective unit that covers the blade. An open section is then formed at the protective unit so as to enable the light-emitting unit to irradiate the blade with the laser light via the open section.

The protective unit can also have a cover that covers the open section.

The motorized cutter with wheels can also have a generator for generating electrical power from the power of the engine, with the light-emitting unit operating on the electrical power supplied by the generator.

It is also possible, for example, for the motorized cutter with wheels to have a battery for storing the electrical power supplied by the generator. The light-emitting unit can then operate on the electrical power supplied by the battery.

It is also preferable for the motorized cutter with wheels to have:
a first sensor for detecting rotation of the engine and transmitting an engine rotation detection signal that indicates whether or not the engine is rotating; and
a first control unit that controls whether the light-emitting unit is on or off in response to the engine rotation detection signal received from the first sensor.

The first control unit then puts the light-emitting unit on in response to starting of the engine and puts the light-emitting unit off in response to stopping of the engine.

It is also preferable for the motorized cutter with wheels to have:
a tank for storing cutting fluid supplied to the blade;
a supply path for supplying the cutting fluid from the tank to the blade;
an on-off valve for opening and closing the supply path;
a second sensor for detecting rotation of the blade and transmitting a blade rotation detection signal indicating whether or not the blade is rotating; and
a second control unit for controlling whether the on-off valve is on or off in response to the blade rotation detection signal received from the second sensor.

The second control unit then puts the on-off valve on in response to starting of the blade and puts the on-off valve off in response to stopping of the blade.

In order to resolve the above problems, a motorized cutter with wheels of a fourth aspect of the present invention comprises:
an engine;
a blade, rotatably driven by the engine, for cutting a work material;
a detection unit for detecting a relative position of the laser light incident substantially perpendicularly to a direction of the axis of rotation of the blade with respect to the blade in the direction of the axis of rotation of the blade;
a display unit for displaying the relative position of the laser light detected by the detection unit; and
a carriage having a plurality of wheels.

It is also preferable for the motorized cutter with wheels to have:
a tank for storing cutting fluid supplied to the blade;
a supply path for supplying the cutting fluid from the tank to the blade;
an on-off valve for opening and closing the supply path;
a second sensor for detecting rotation of the blade and transmitting a blade rotation detection signal indicating whether or not the blade is rotating; and a second control unit for controlling whether the on-off valve is on or off in response to the blade rotation detection signal received from the second sensor.

The second control unit then puts the on-off valve on in response to starting of the blade and puts the on-off valve off in response to stopping of the blade.

In order to resolve the above problems, a cutting method of a fifth aspect of the present invention is a cutting method for cutting a work material by advancing a blade comprising:
rotating the blade;
emitting laser light traveling substantially perpendicularly to a direction of an axis of rotation of the blade; and
controlling a position and an orientation of the blade so that the work material is irradiated with the laser light in parallel with a line drawn on the work material.

The cutting method can also have:
preparing the blade, the light-emitting unit for emitting the laser light, and the support member for supporting the light-emitting unit pivotably about an axis parallel with the axis of rotation of the blade and movably in parallel with the axis of rotation of the blade;
arranging the light-emitting unit at a position where the blade is irradiated with the laser light by rotating the light-emitting unit about an axis parallel with the axis of rotation of the blade and moving the light-emitting unit in parallel with the axis of rotation of the blade; and
arranging the light-emitting unit at a position where the work material is irradiated with the laser light by rotating the light-emitting unit about an axis parallel with the axis of rotation of the blade.

The position and orientation of the blade can be controlled while detecting a relative position of the laser light with respect to the line and displaying the detected relative position of the laser light.

In order to resolve the above problems, a cutting method of a sixth aspect of the present invention is a cutting method for cutting a work material by advancing a blade comprising:
rotating the blade;
emitting laser light traveling along a plane substantially parallel with a line drawn on the work material;
detecting a relative position of the laser light incident substantially perpendicularly to a direction of an axis of rotation of the blade with respect to the plate in the direction of the axis of rotation of the blade and displaying the detected relative position of the laser light; and
controlling the position and orientation of the blade so that the relative position of the laser light is maintained.

Advantageous Effects of Invention

According to the present invention, it is possible to provide a motorized cutter and a motorized cutter with wheels with superior ease of operation and to provide a highly-reliable cutting method.

DESCRIPTION OF EMBODIMENTS

The following is an explanation with reference to the drawings of a motorized cutter, a motorized cutter with wheels, and a cutting method of the embodiments of the present invention. Elements providing common functions are given the same numerals even when there are differences in materials, shapes, arrangements, quantities, or the like between the embodiments.

First Embodiment

Figure 1:
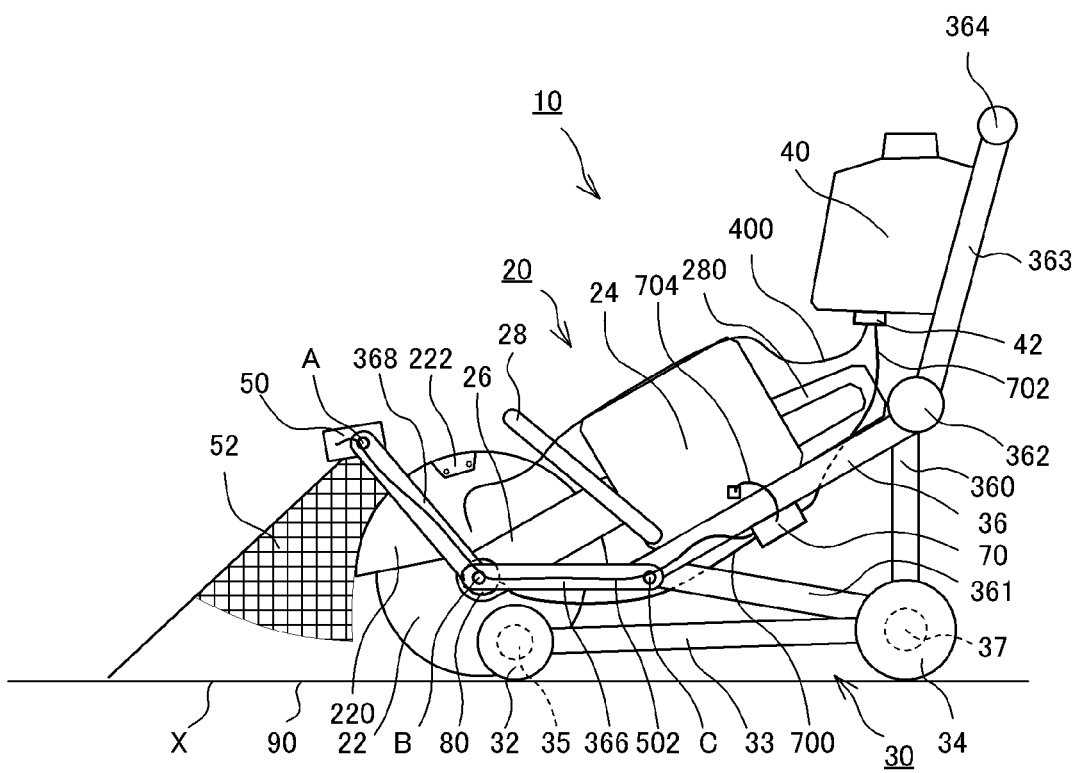
FIG. 1 is a side view illustrating a motorized cutter with wheels of a first embodiment.
Figure 2:
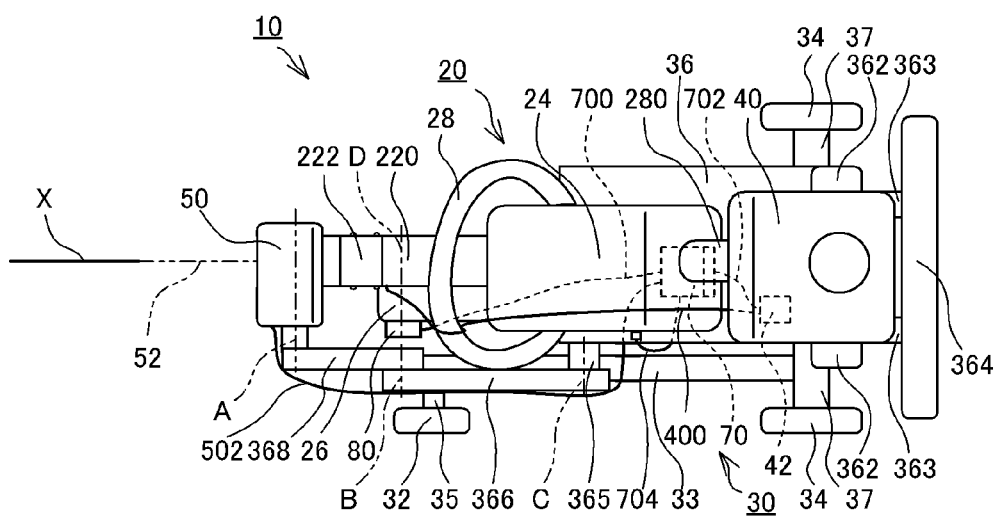
FIG. 2 is a plan view of the motorized cutter with wheels illustrated in FIG. 1.

FIG. 1 is a side view illustrating a motorized cutter with wheels 10 of a first embodiment of the present invention, and FIG. 2 is a plan view illustrating the motorized cutter with wheels 10 illustrated in FIG. 1. The motorized cutter with wheels 10 comprises a motorized cutter 20 and a carriage 30 that the motorized cutter 20 is mounted on. The motorized cutter 20 comprises a blade 22, an engine 24 supplying rotational power to the blade 22, a support frame 26 connected to the engine 24 and rotatably supporting the blade 22, a front handle 28, and a rear handle 280. The side of the blade 22 of the motorized cutter 20 (the left in FIGS. 1 and 2) is defined as the front, and the side of the rear handle 280 of the motorized cutter 20 (the right in FIGS. 1 and 2) is defined as the rear.

Figure 3:
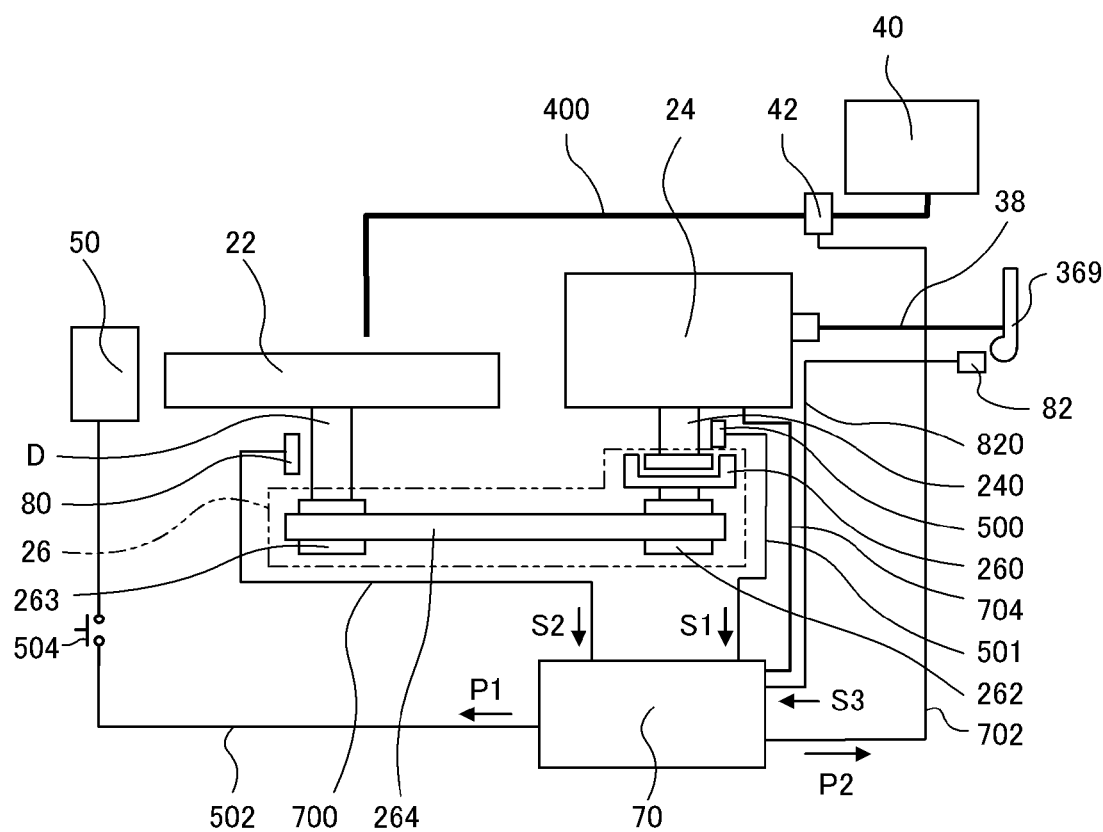
FIG. 3 is a schematic view illustrating the motorized cutter with wheels depicted in FIG. 1.

As illustrated in FIG. 3, the support frame 26 rotatably supports a rotating shaft D connected to the blade 22. The support frame 26 contains a centrifugal clutch 260 connected to an output shaft 240 of the engine 24, a pulley 262 connected to the centrifugal clutch 260, a pulley 263 connected to the rotating shaft D, and a belt 264 connecting the pulleys 262 and 263. When the engine 24 is driven at greater than a prescribed speed, the centrifugal clutch 260 connects the output shaft 240 and the pulley 262. This means that the power of the engine 24 can be transmitted from the output shaft 240 to the blade 22 via the pulley 262, the belt 264, and the pulley 263. The blade 22 receiving the power from the engine 24 is then rotatably driven about the axis of the rotating shaft D. A first rotation sensor (first sensor) 500 that detects rotation of the output shaft 240 and a second rotation sensor 80 (second sensor) that detects a rotation of the blade 22 are provided at the outside surface of the support frame 26.

As illustrated in FIG. 1, part of the blade 22 is protectively covered by a wheel guard (protective unit) 220. An open section 224 (refer to FIG. 5) that exposes the blade 22 is formed at the wheel guard 220. A cover 222 that covers the open section 224 is detachably provided at the wheel guard 220.

Next, a description is given of the carriage 30 the motorized cutter 20 is fitted to. As illustrated in FIG. 2, the carriage 30 is equipped with a pedestal 36, a front wheel 32, and two rear wheels 34. The front wheel 32 is rotatably supported at a front axle 35 and the two rear wheels 34 are rotatably supported at a rear axle 37. The front axle 35 and the rear axle 37 are arranged in parallel with each other and are coupled by an axle connecting rod 33. As illustrated in FIG. 1, two vertical support rods 360 arranged substantially vertically and two horizontal support rods 361 arranged substantially horizontally are pivotably connected to the rear axle 37. The vertical support rods 360 and the horizontal support rods 361 support the pedestal 36. The motorized cutter 20 is mounted at the pedestal 36 so that the blade 22 is arranged substantially perpendicularly.

A light-emitting unit 50 described later is fitted to the pedestal 36 via an arm 366 and an arm 368. A stay 365 is provided projecting at the lower left of the pedestal 36 as depicted in FIG. 2. One end of the arm 366 is connected to the stay 365 pivotably about an axis of a shaft C (refer to FIG. 1). One end of the arm 368 is connected to the other end of the arm 366 pivotably about an axis of a shaft B (refer to FIG. 1). The light-emitting unit 50 is connected to the other end of the arm 368 pivotably about an axis of the shaft A (refer to FIG. 1) and is slidable along an axial direction of the shaft A. The shafts A, B, and C are arranged substantially parallel to the rotating shaft D that is the axis of rotation of the blade 22. The light-emitting unit 50 illuminates a surface that is substantially the same surface as the rotating surface of the blade 22 with laser light 52. Therefore, the light-emitting unit 50 is connected to the pedestal 36 pivotably about the axis of the shaft A and is slidable in the axial direction of the shaft A while holding the rotating surface of the blade 22 and the laser light 52 substantially in parallel with each other regardless of the pivot positions of the arms 366 and 368. The arm 366 can be arranged so that the shaft B provided at the other end of the arm 366 and the rotating shaft D are substantially coaxial by pivoting the arm 366 about the axis of the shaft C. Rubber pads (not shown) are provided at a connecting section of the pedestal 36 and the arm 366, a connecting section of the arm 366 and the arm 368, and a connecting section of the arm 368 and the light-emitting unit 50. The rubber pads suppress the transmission of vibrations occurring at the motorized cutter with wheels 10 to the light-emitting unit 50 and stabilize the irradiation position of the laser light 52.

The carriage 30 is further provided with a lateral rod 362 that connects the pedestal 36 and upper ends of the vertical support rods 360, two tank support rods 363 projecting upwards from the lateral rod 362, and a handle 364 connecting the upper ends of the tank support rods 363. The tank support rods 363 support a tank 40 described later. An operator can move the carriage 30 forwards and backwards by holding the handle 364. The handle 364 is provided with a throttle lever 369 (refer to FIG. 3) for regulating the quantity of air-fuel mixture supplied to a combustion chamber (not shown) of the engine 24.

Next, a description is given of a method for supplying cutting fluid, for improving the finished surface of a roadbed 90 cut by the motorized cutter with wheels 10 and suppressing wear of the blade 22 and suppressing increases in temperature of the roadbed 90 due to cutting resistance when cutting the roadbed 90. The cutting fluid is stored in the tank 40 fitted to the front of the two tank support rods 363 as depicted in FIG. 1. A solenoid valve (on-off valve) 42 is provided at a lower part of the tank 40. The cutting fluid is supplied from the tank 40 to the blade 22 via the solenoid valve 42 and a tube (supply path) 400 as the solenoid valve 42 is opened.

Next, a description is given of the light-emitting unit 50 fitted to the arm 368 of the carriage 30. The light-emitting unit 50 irradiates the laser light 52 onto substantially the same surface as the rotating surface of the blade 22 illustrated in FIG. 1. In other words, the light-emitting unit 50 emits the laser light 52 passing substantially perpendicularly to the axis of the rotating shaft D that is the axis of rotation of the blade 22 through at least one point the blade 22 is facing towards. The light-emitting unit 50 is actuated by electrical power supplied by an engine generator (generator) 27 illustrated in FIG. 4.

Figure 4:
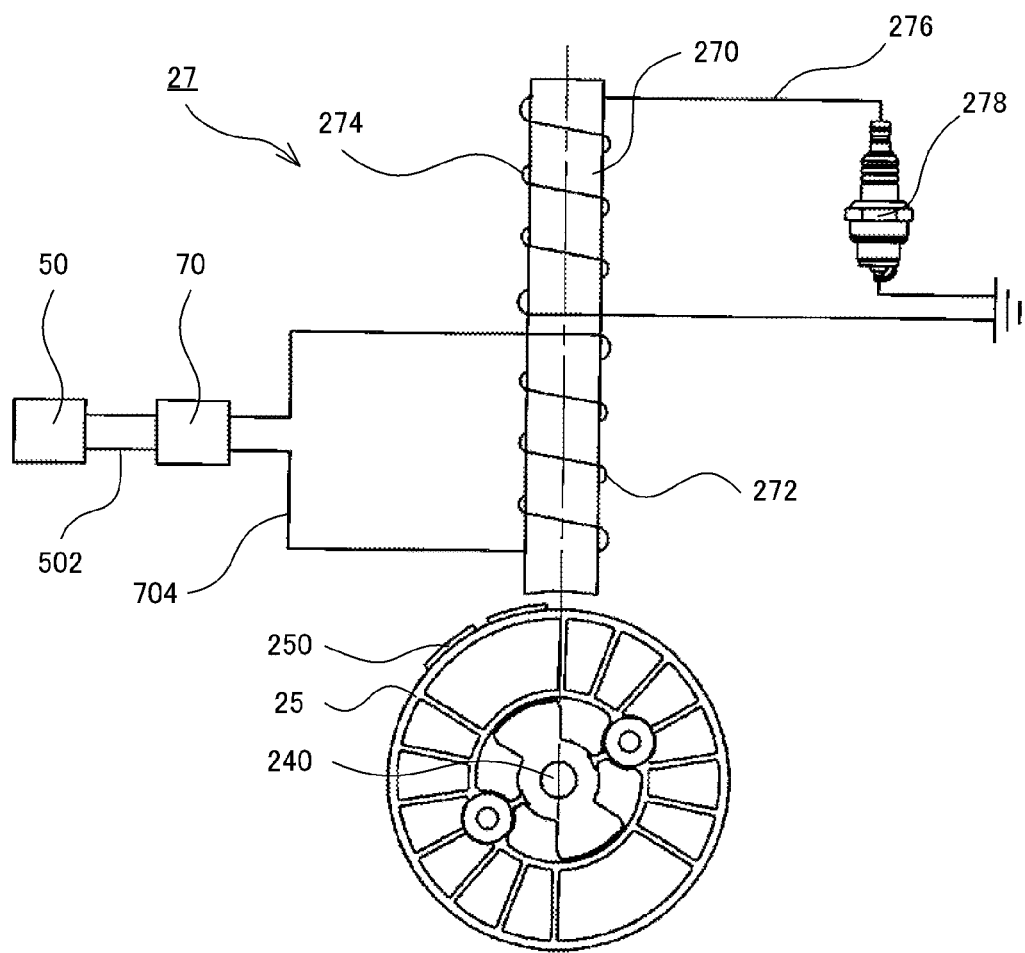
FIG. 4 is a schematic view illustrating a light-emitting unit, a control unit, and an engine generator of the motorized cutter with wheels depicted in FIG. 1.

A description is now given of the engine generator 27 and a method for starting the engine 24 with reference to FIG. 4. The engine generator 27 is mainly comprised of a magneto rotor 25, an iron core 270, and a primary coil 272 and secondary coil 274 wrapped around the iron core 270.

The magneto rotor 25 is disc-shaped and is concentrically connected to the output shaft 240 of the engine 24. A permanent magnet 250 is provided at an outer peripheral surface of the magneto rotor 25. When the magneto rotor 25 is rotated in accompaniment with rotation of the output shaft 240, the permanent magnet 250 causes a change in magnetic field around the primary coil 272 wrapped around the iron core 270 and causes a current flow in the primary coil 272.

The primary coil 272 is connected to the light-emitting unit 50 via a cable 704, a control unit 70 (first and second control units), and a cable 502 and supplies electrical power to the light-emitting unit 50. The control unit 70 is comprised of a resistor and a capacitor etc. and removes noise from current generated in the primary coil 272. The secondary coil 274 is connected to a spark plug 278 via a cable 276. The spark plug 278 is provided at the combustion chamber of the engine 24.

The motorized cutter 20 adopts an engine starting method using a recoil starter (not shown). When a recoil rope (not shown) provided at the recoil starter is pulled, the output shaft 240 of the engine 24 rotates. When the output shaft 240 rotates, the magneto rotor 25 connected to the output shaft 240 also rotates, and a current flows in the primary coil 272.

The secondary coil 274 generates a high-voltage due to mutual induction due to the current flowing in the primary coil 272, and a spark is therefore generated at the spark plug 278. The air-fuel mixture supplied to the combustion chamber of the engine 24 is therefore combusted as a result of sparking of the spark plug 278, and the engine 24 starts and continuously operates.

As illustrated in FIG. 3, electrical power created by the engine generator 27 is supplied to the control unit 70 from the engine 24 via the cable 704. A first rotation sensor 500 detects rotation of the output shaft 240 of the engine 24 and sends an engine rotation detection signal S1 indicating whether or not the engine 24 is rotating to the control unit 70 via a cable 501. Upon receiving the engine rotation detection signal S1 indicating that the engine 24 is rotating, the control unit 70 supplies electrical power P1 from the engine generator 27 to the light-emitting unit 50 via the cable 502. The light-emitting unit 50 emits the laser light 52 in response to the electrical power P1 supplied by the control unit 70. The operator can then make the light-emitting unit 50 go on and off by operating a switch 504 provided on the cable 502. Upon receiving an engine rotation detection signal S1 indicating that the engine has stopped, the control unit 70 stops the supply of the electrical power P1 to the light-emitting unit 50. When the supply of the electrical power P1 is stopped, the light-emitting unit 50 stops emitting the laser light 52.

Figure 5:
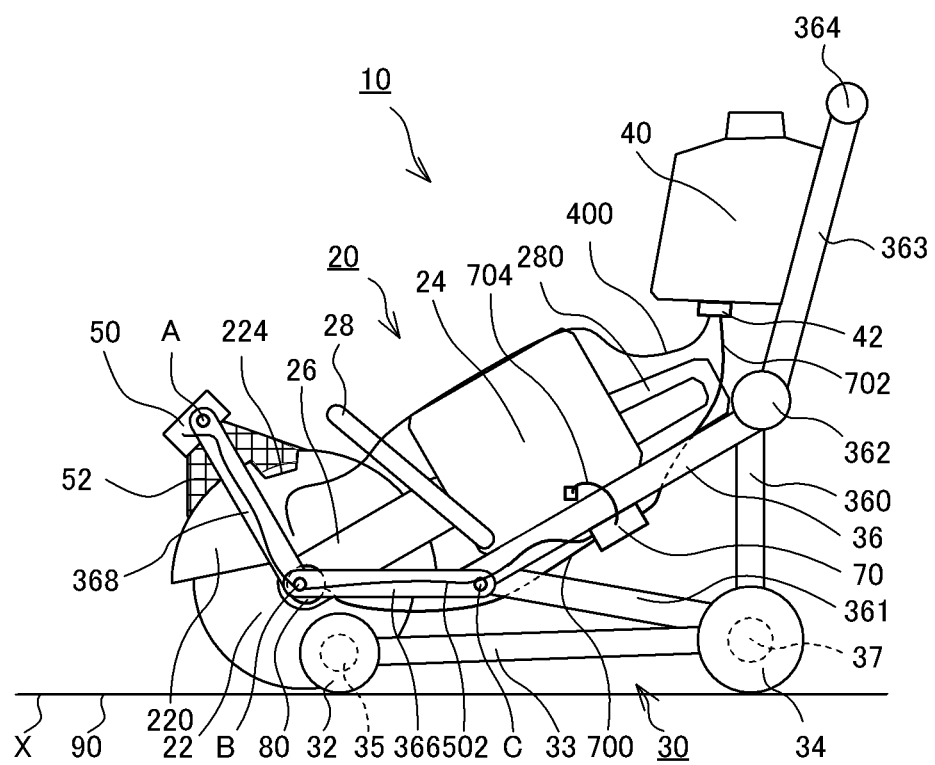
FIG. 5 is a side view of the motorized cutter with wheels illustrated in FIG. 1, with the light-emitting unit oriented so as to irradiate a blade with laser light.
Figure 6:
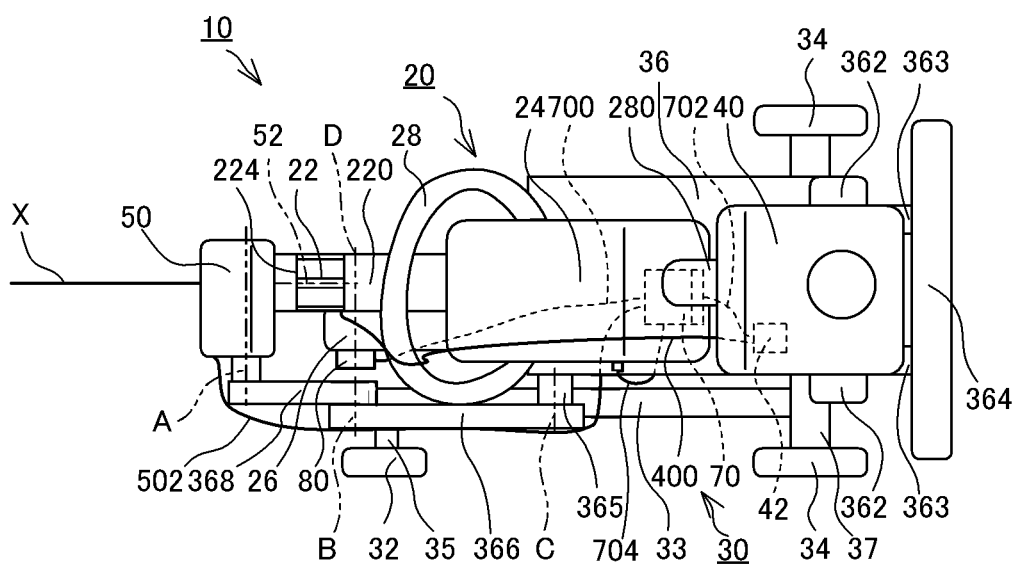
FIG. 6 is a plan view of the motorized cutter with wheels illustrated in FIG. 5.

Next, a description is given of a method for adjusting the irradiation position of the laser light 52 with respect to the blade 22. First, the cover 222 (refer to FIGS. 1 and 2) covering the open section 224 of the wheel guard 220 is removed, and the blade 22 is exposed from the open section 224 as illustrated in FIGS. 5 and 6. Next, the arm 366 is pivoted about the axis of the shaft C so that the axis of the shaft B is substantially coincide with the axis of the rotating shaft D (refer to FIG. 6), and the shaft C is fixed. It is therefore possible to prevent the light-emitting unit 50 from making contact with the wheel guard 220 and the blade 22 when the arm 368 is pivoted about the axis of the shaft B.

Next, the arm 368 is made to pivot about the axis of the shaft B so that the light-emitting unit 50 is arranged in the vicinity of the open section 224, and the shaft B is fixed. Next, the engine 24 is started. The control unit 70 then supplies electrical power to the light-emitting unit 50 in response to the starting of the engine 24 and the light-emitting unit 50 emits the laser light 52.

Next, the light-emitting unit 50 is made to pivot about the axis of the shaft A so that the blade 22 is irradiated with the laser light 52 via the open section 224. If the surface irradiated with the laser light 52 illustrated in FIG. 6 does not coincides with the rotating surface of the blade 22, the light-emitting unit 50 is slid in an axial direction of the shaft A so that the surface irradiated with the laser light 52 coincides with the rotating surface of the blade 22, and the light-emitting unit 50 is fixed in an axial direction of the shaft A. As a result, the surface irradiated with the laser light 52 and the rotating surface of the blade 22 are maintained in substantially the same plane even if the light-emitting unit 50 is pivoted about the axis of the shaft A so that the laser light 52 irradiates the road bed 90. It is therefore possible to confirm the cutting position and the cutting direction of the blade 22 by looking at the irradiation position of the laser light 52 on the roadbed 90. It is also possible to ensure that the surface irradiated with the laser light 52 and the rotating surface of the blade 22 are substantially in the same plane even if the position of the blade 22 changes as a result of, for example, detachment of the motorized cutter 20 or changing of the blade 22 by adjusting the irradiation position of the laser light 52 in this manner.

Next, a description is given of a method of cutting the roadbed 90. As illustrated in FIG. 2, a line X is drawn at the location to be cut as a target in advance prior to cutting the roadbed 90. Next, the irradiation position of the laser light 52 with respect to the blade 22 is adjusted according to the above procedure. The cover 222 is then fitted to the open section 224 (refer to FIG. 5) of the wheel guard 220 so that the blade 22 is not exposed. The light-emitting unit 50 is then pivoted about the axis of the shaft A so as to emit the laser light 52 towards the front of the motorized cutter with wheels 10. Next, alignment of the motorized cutter with wheels 10 is adjusted so that the laser light 52 lines up with the line X by operating the handle 364.

Next, the air-fuel mixture supplied to the combustion chamber of the engine 24 is increased by operating the throttle lever 369, illustrated in FIG. 3, provided at the handle 364. The speed of the engine 24 is therefore increased, and the centrifugal clutch 260 connects the output shaft 240 of the engine 24 and the pulley 262 of the support frame 26. The blade 22 therefore receives the power of the engine 24 via the pulley 262, the pulley 263, the belt 264, and the rotating shaft D so as to rotate. The second rotation sensor 80 detects rotation of the blade 22 and sends a blade rotation detection signal S2 indicating whether or not the blade 22 is rotating to the control unit 70 via a cable 700. Upon receiving the blade rotation detection signal S2 indicating that the blade 22 is rotating, the control unit 70 sends a solenoid valve drive signal P2 instructing the solenoid valve 42 to open to the solenoid valve 42 via a cable 702. The solenoid valve 42 then opens in response to the solenoid valve drive signal P2 received from the control unit 70. When the solenoid valve 42 opens, the cutting fluid is sent from the tank 40, via the tube 400, to the blade 22. Upon receiving a blade rotation detection signal S2 indicating that the blade 22 has stopped, the control unit 70 sends a solenoid valve drive signal P2 instructing the solenoid valve 42 to close to the solenoid valve 42 via the cable 702. The solenoid valve 42 then closes in response to the solenoid valve drive signal P2 received from the control unit 70. When the solenoid valve 42 closes, the supply of cutting fluid from the tank 40 to the blade 22 is stopped.

Next, the vertical support rods 360, the horizontal support rods 361, and the pedestal 36, supported by the vertical support rods 360 and the horizontal support rods 361, are pivoted about the axis of the rear axle 37 by operating the handle 364. Because the motorized cutter 20 is fixed to the pedestal 36, when the pedestal 36 is pivoted in an anti-clockwise direction in FIG. 1, the blade 22 goes below the front wheel 32, i.e. falls below the road surface, and a notch is formed in the roadbed 90. The roadbed 90 is then cut along the line X as a result of pushing the handle 364 forwards while maintaining this state.

According to the motorized cutter with wheels 10 of this embodiment, it is possible to confirm that the cut plane formed by the blade 22 is positioned on the line X both prior to and during cutting by irradiating the road bed 90 with the laser light 52 designating the position towards which the blade 22 is facing. It is also possible to adjust the position of the light-emitting unit 50 so that the plane of irradiation of the laser light 52 and the plane of rotation of the blade 22 are arranged substantially in the same plane by irradiating the blade 22 with laser light 52 of the light-emitting unit 50 via the open section 224 formed in the wheel guard 220.

Second Embodiment

Figure 7:
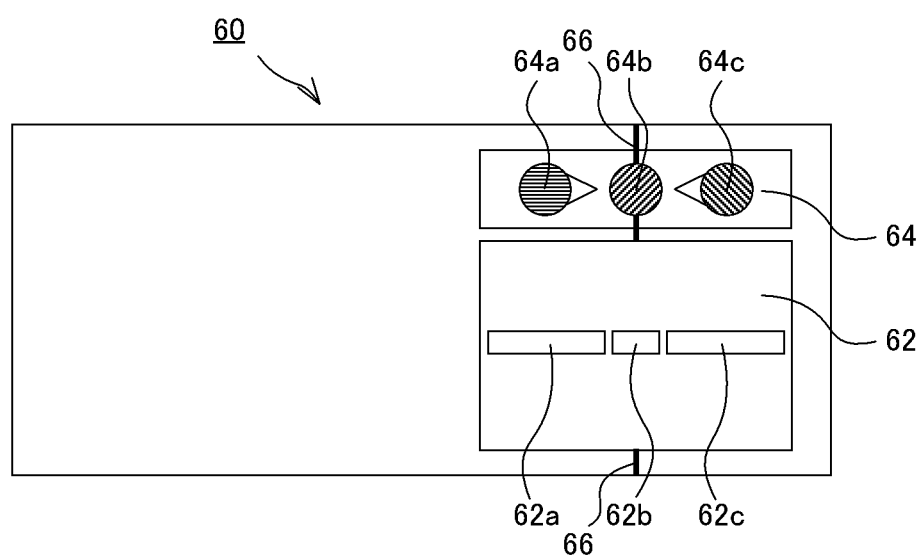
FIG. 7 is a front view illustrating a photoreceiver of a second embodiment.
Figure 8:
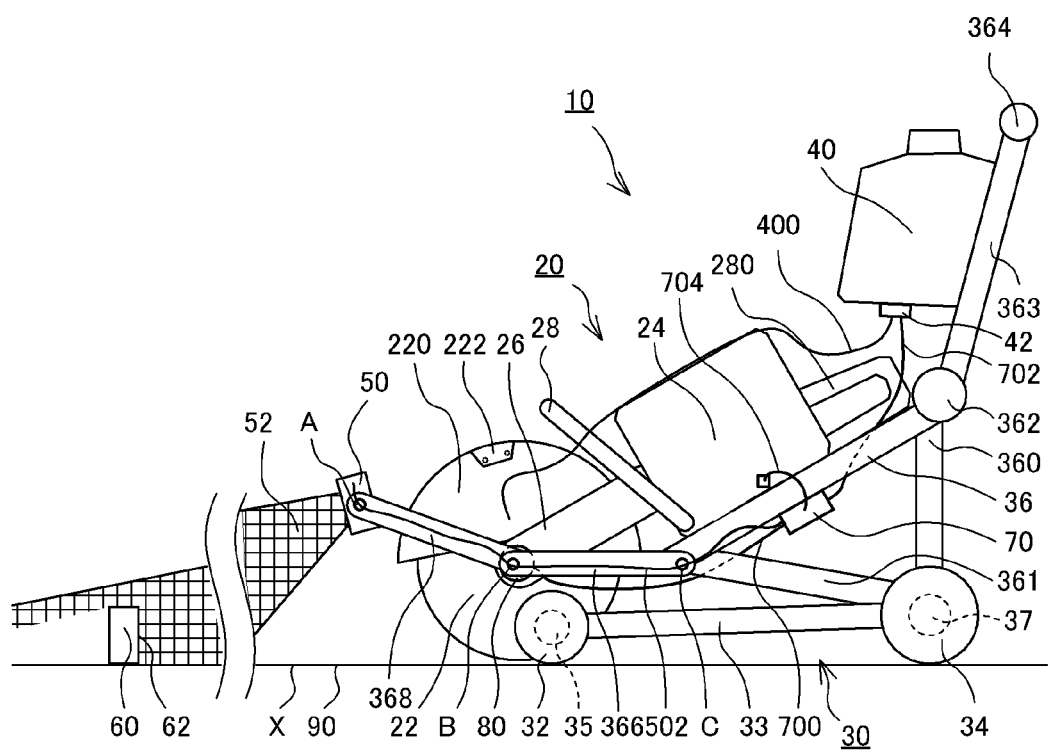
FIG. 8 is a side view illustrating a motorized cutter with wheels of the second embodiment.
Figure 9:
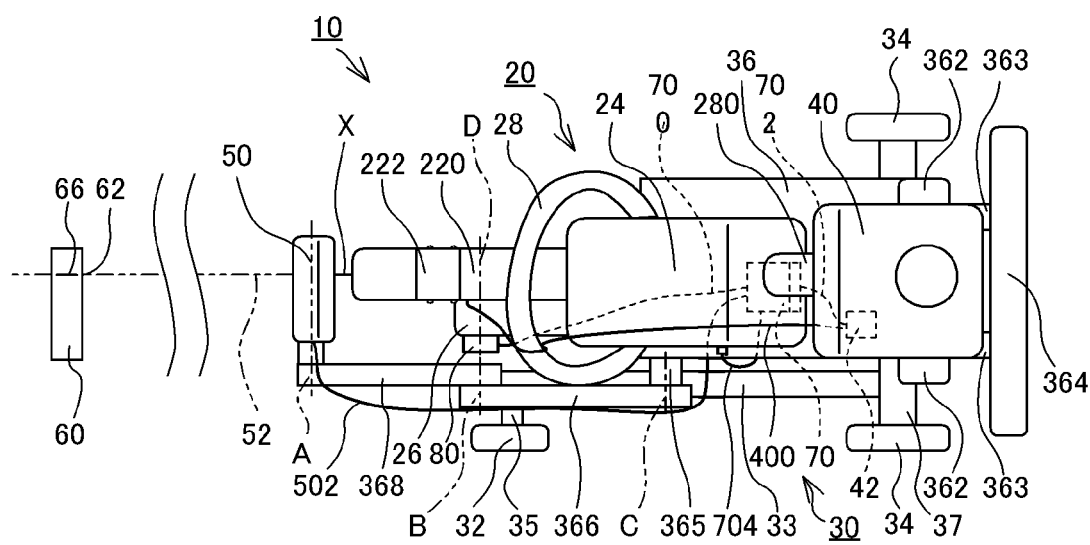
FIG. 9 is a plan view of the motorized cutter with wheels illustrated in FIG. 8.

Next, a description is given of a cutting method of a second embodiment with reference to FIGS. 7 to 9. This cutting method uses the motorized cutter with wheels 10 described above and a photoreceiver 60 illustrated in FIG. 7.

First, a detailed explanation is given of the photoreceiver 60 with reference to FIG. 7. The photoreceiver 60 is equipped with a detection unit 62 having photodiodes 62a, 62b, and 62c, and a display unit 64 having display LEDs (Light Emitting Diodes) 64a, 64b, and 64c. When light hits the detection unit 62 and the intensity of this light is greater than a threshold value, the display LEDs 64a, 64b, and 64c of the display unit 64 corresponding to the respective photodiodes 62a, 62b, and 62c light up. It is therefore possible to confirm which portion is being irradiated with the laser light 52 by looking at the lit display LED 62a, 62b, or 62c. A central line 66 that passes perpendicularly to the center of the photodiode 62b is drawn as a target to be irradiated with the laser light 52 at the outer surface of the photoreceiver 60.

Band-pass filters (not shown) are provided within the circuits for the photodiodes 62a, 62b, and 62c within the photoreceiver 60. The band pass filters only allow the laser light 52 modulated to a prescribed frequency to pass and remove external light that is continuous light. This means that by modulating the laser light 52 emitted from the light-emitting unit 50 at a prescribed frequency and irradiating the photoreceiver 60 having the band pass filters with the laser light 52, it is possible to detect only the light intensity of the laser light 52 and it is possible to accurately display the position of the laser light 52.

Next, a method of cutting the roadbed 90 using the motorized cutter with wheels 10 and the photoreceiver 60 is explained with reference to FIGS. 8 and 9. First, as illustrated in FIG. 9, the photoreceiver 60 is arranged on the roadbed 90 so that the central line 66 of the photoreceiver 60 is lined up on the line X of the roadbed 90, and the detection unit 62 and the display unit 64 face towards the motorized cutter with wheels 10. Next, the irradiation position of the laser light 52 with respect to the blade 22 is adjusted using the method illustrated in the first embodiment. Next, the cover 222 is fitted to the open section 224 (refer to FIG. 5) of the wheel guard 220 so that the blade 22 is not exposed. The light-emitting unit 50 is then pivoted about the axis of the shaft A so as to emit the laser light 52 towards the front of the motorized cutter with wheels 10, as depicted in FIG. 8.

Next, the orientation of the motorized cutter with wheels 10 is adjusted so that the central line 66 (refer to FIG. 7) of the photoreceiver 60 is irradiated with the laser light 52 by operating handle 364 while watching the display LEDs 64a, 64b, and 64c (refer to FIG. 7) of the display unit 64 of the photoreceiver 60. For example, when the display LED 64a is lit, this indicates that the orientation of the motorized cutter with wheels 10 has strayed to the left direction in FIG. 7. When the display LED 64b is lit, this indicates that the orientation of the motorized cutter with wheels 10 is appropriate. For example, when the display LED 64c is lit, this indicates that the orientation of the motorized cutter with wheels 10 has strayed to the right direction in FIG. 7. It is therefore possible to correct the orientation of the motorized cutter with wheels 10 based on which of the display LEDs 64a, 64b, and 64c of the display unit 64 is lit.

According to the above cutting method, it is possible to line up the laser light 52 and the line X at a further position compared with when cutting is carried out without using the photoreceiver 60. It is therefore possible to more accurately adjust the orientation of the motorized cutter with wheels 10. It is also possible to rapidly confirm that the orientation of the motorized cutter with wheels 10 strays during cutting. It is therefore possible to more easily correct the orientation of the motorized cutter with wheels 10. For these reasons, it is possible to implement more highly reliable cutting.

Third Embodiment

In the first and second embodiments, the light-emitting unit 50 is connected to the carriage 30 of the motorized cutter with wheels 10. However, it is also possible to connect the light-emitting unit 50 to the motorized cutter 20 of the motorized cutter with wheels 10 as described in a third embodiment. The following is an explanation of a motorized cutter with wheels 10 of the third embodiment with reference to FIGS. 10 and 11.

Figure 10:
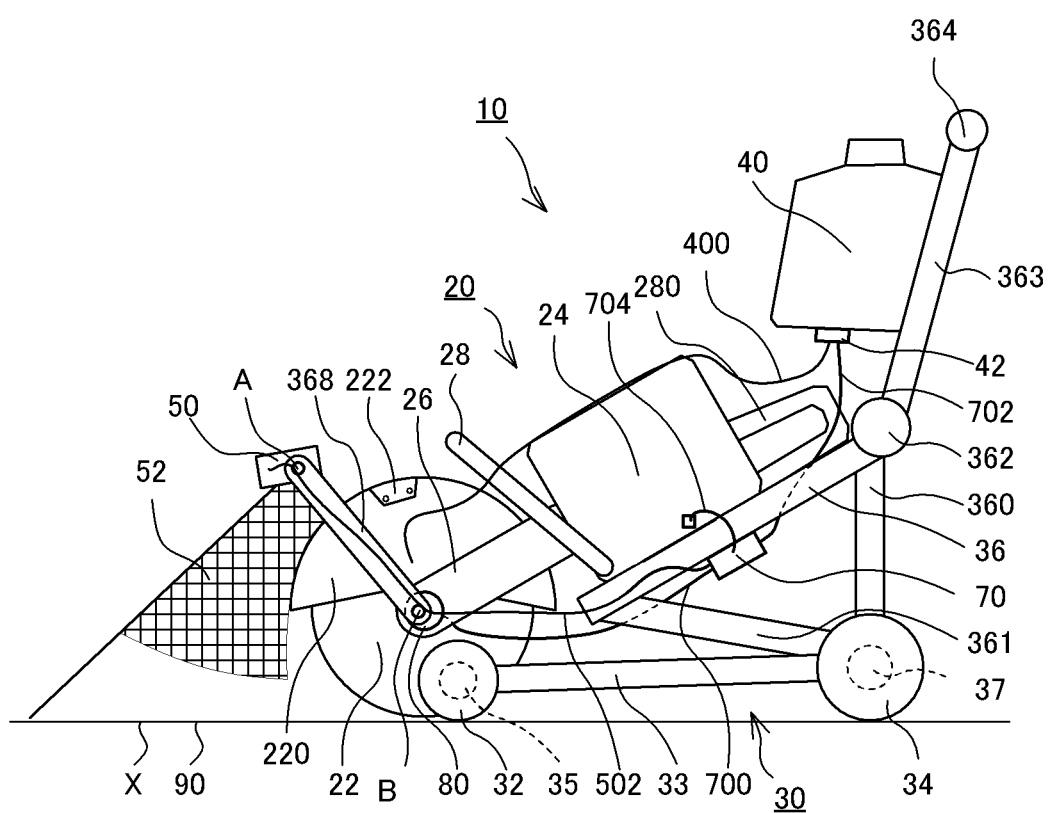
FIG. 10 is a side view illustrating a motorized cutter with wheels of a third embodiment.
Figure 11:
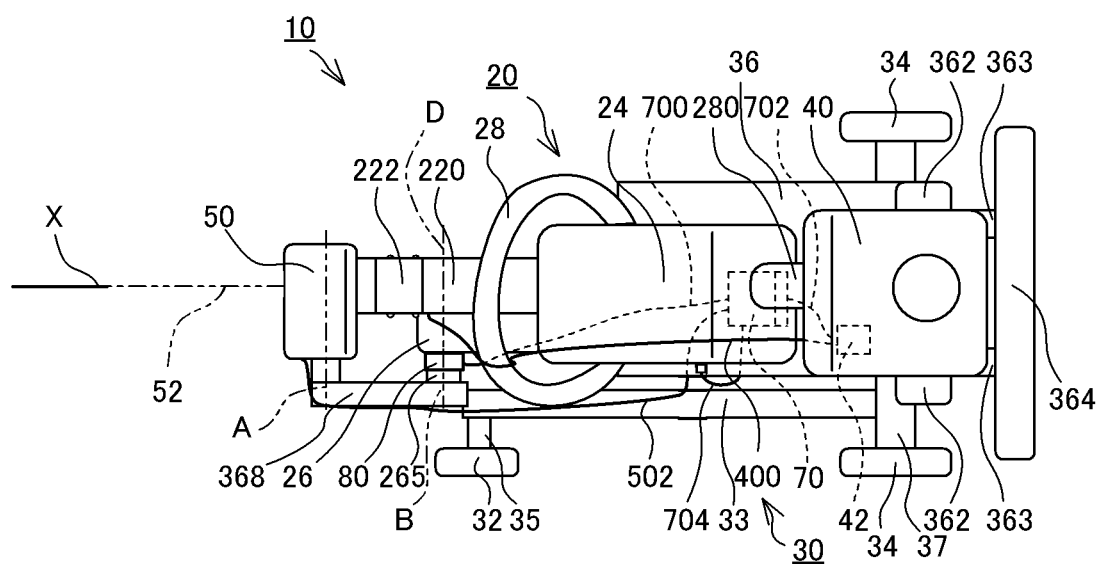
FIG. 11 is a plan view illustrating the motorized cutter with wheels depicted in FIG. 10.

FIG. 10 is a side view illustrating the motorized cutter with wheels 10 of the third embodiment of the present invention, and FIG. 11 is a plan view illustrating the motorized cutter with wheels 10 illustrated in FIG. 10. As illustrated in FIGS. 10 and 11, one end of the arm 368 is connected to the support frame 26 of the motorized cutter 20 pivotably about the axis of the shaft B arranged coaxially with the rotating shaft D. The light-emitting unit 50 is connected to the remaining end of the arm 368 pivotably about the axis of the shaft A. It is therefore possible to remove the motorized cutter 20 from the carriage 30 together with the light-emitting unit 50. This means that it is possible to carry out cutting with the light-emitting unit 50 irradiating the black line X or the photoreceiver 60 with the laser light 52 with the motorized cutter 20 independently.

Additionally, according to the motorized cutter with wheels 10 of this embodiment, the light-emitting unit 50 is connected to the motorized cutter 20. This differs to the motorized cutter with wheels 10 of the first and second embodiments where the light-emitting unit 50 is connected to the carriage 30 in that misalignment between the plane of irradiation of the laser light 52 emitted by the light-emitting unit 50 and the plane of rotation of the blade 22 is slight. It is therefore possible to omit the open section 224 and the cover 222 illustrated in the first and second embodiments.

It is also possible for, for example, the control unit 70 to be fixed to the side of the support frame 26 in order to increase ease of operation of the motorized cutter 20 used individually.

It is also possible to adopt a dry type wheel that does not require cutting fluid as the blade 22. It is therefore possible to omit the tank 40, the tube 400, the solenoid valve 42, the cable 702, the second rotation sensor 80, the cable 700, and the carriage 30 illustrated in the first and second embodiments by adopting this configuration. It is therefore possible to further improve the ease of operation of the motorized cutter 20.

Figure 20:
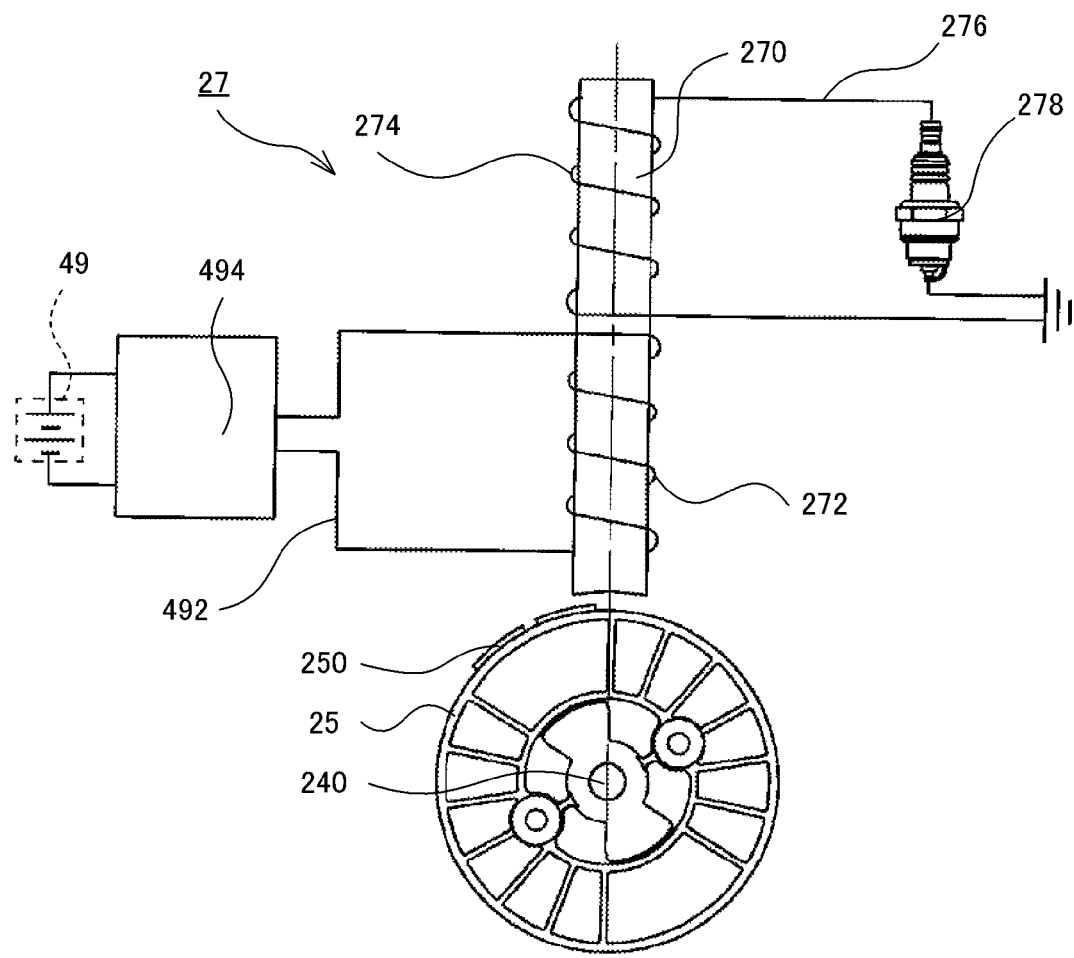
FIG. 20 is an outline view illustrating a battery, charging circuit, and engine generator of a modified example of the embodiments.

The electrical power for the light-emitting unit 50 can be supplied by a dry cell (not shown) or a battery 49 (refer to FIG. 20) described later. It is therefore possible to omit the control unit 70, cable 502 and cable 704, first rotation sensor 500, and the cable 501 (refer to FIG. 3) illustrated in the first and second embodiments by adopting this configuration. It is therefore possible to further improve the ease of operation of the motorized cutter 20.

The light-emitting unit 50 is pivotably supported by the arm 368 connected to the support frame 26 in the third embodiment, but can also be pivotably supported at the wheel guard 220. The motorized cutter 20 is equipped with one light-emitting unit 50 in the third embodiment, but can also be equipped with a plurality of light-emitting units 50. In the fourth embodiment explained in the following, an explanation is given of a motorized cutter 21 equipped with these configurations.

Fourth Embodiment

Figure 12:
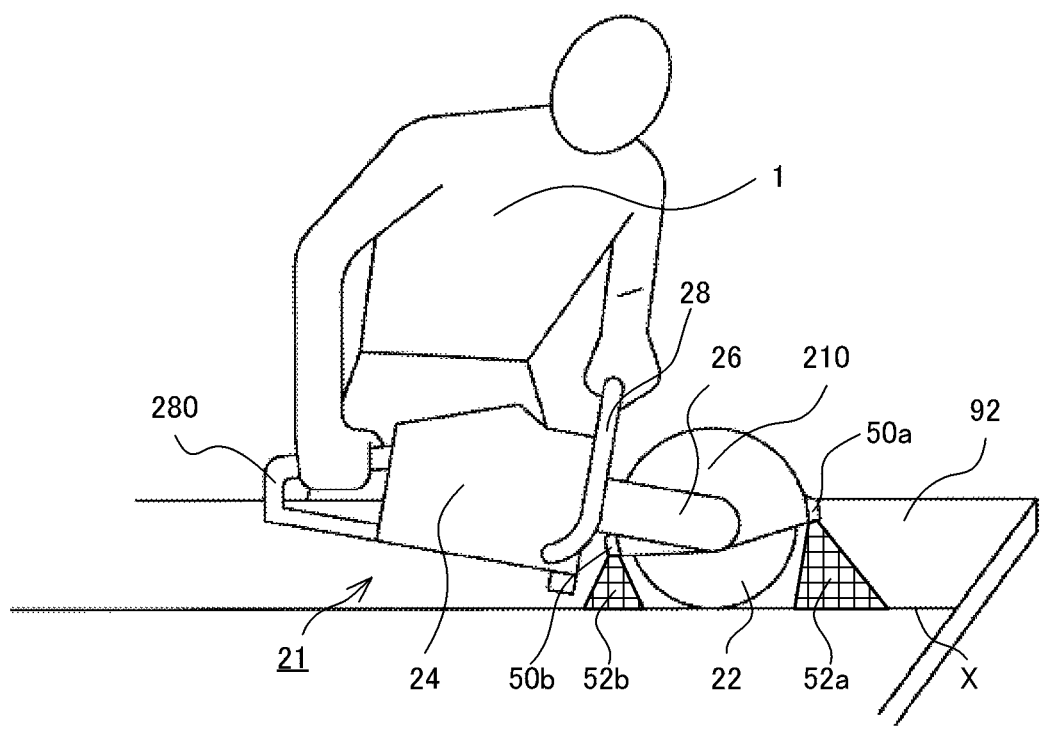
FIG. 12 is a schematic view illustrating a motorized cutter of a fourth embodiment cutting a plate material.

The following is an explanation of the motorized cutter 21 of the fourth embodiment with reference to FIGS. 12 to 17. FIG. 12 is a schematic view showing a situation where a plate material 92 is cut using the motorized cutter 21 of the fourth embodiment of the present invention. Light-emitting units 50a and 50b are provided at the front end and the rear end of a wheel guard 210 of the motorized cutter 21. The light-emitting units 50*a* and 50*b* are arranged so that the planes of irradiation of laser lights 52*a* and 52*b* emitted by the light-emitting units 50*a* and 50*b* are positioned substantially in the same plane as the plane of rotation of the blade 22.

The structures for fixing the light-emitting units 50*a* and 50*b* to the wheel guard 210 only differs in the positions. A detailed explanation is given in the following of the structure for fixing the light-emitting unit 50*a* to the front end of the wheel guard 210 as a representative.

Figure 13:
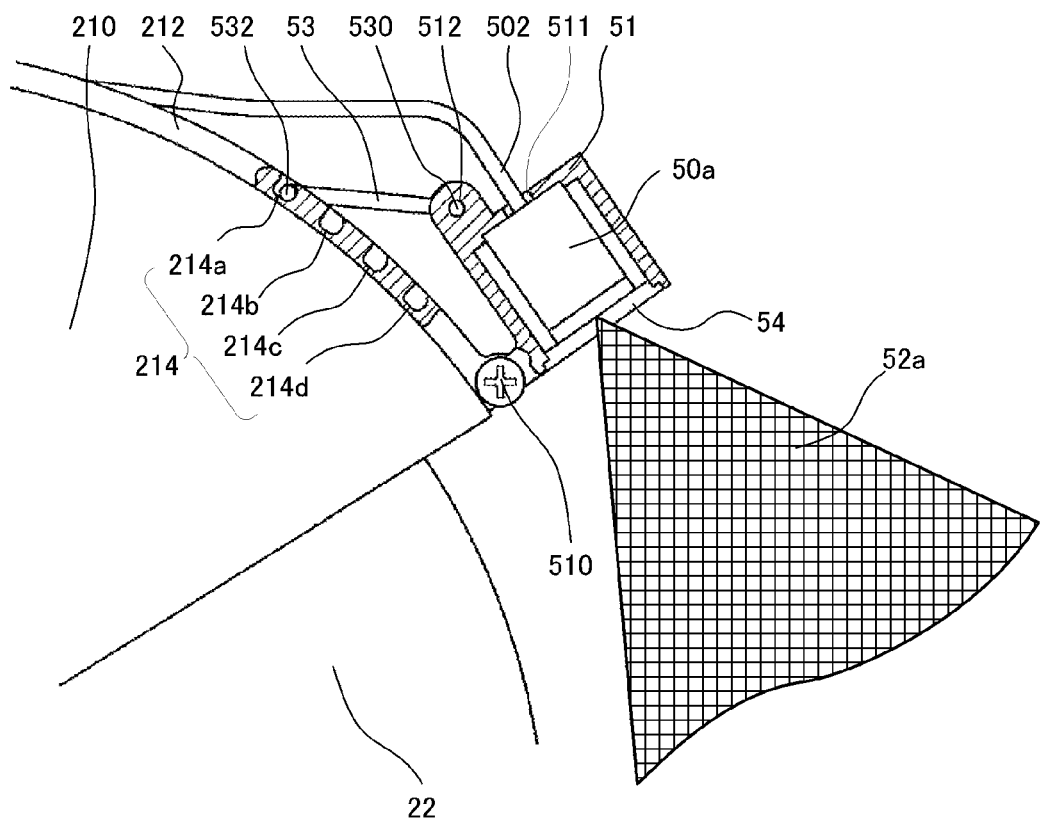
FIG. 13 is a cross-sectional enlarged view illustrating a light-emitting unit of the motorized cutter depicted in FIG. 12.

As illustrated in an enlarged manner in FIG. 13, the light-emitting unit 50*a* is covered by a box-shaped case 51 that protects the light-emitting unit 50*a* and a cap 54 formed from transparent material and connected to an open section of the case 51. A hole 511 for inserting through the cable 502 and an engaging hole 512 pivotably engaging with a front end 530 of a hook section 53 described later are formed at the case 51.

The light-emitting unit 50*a* is connected to the primary coil 272 of the engine generator 27 (refer to FIG. 4) via the cable 502 and supplied with the electrical power for emitting the laser light 52*a*.

A plurality of engaging grooves 214 (214*a*, 214*b*, 214*c*, 214*d*) are formed at an outside edge 212 of the wheel guard 210 that engage with a rear end 532 of the hook section 53 described later. An end of the case 51 of the light-emitting unit 50*a* is pivotably supported by a screw 510 at the end of the outside edge 212 of the wheel guard 210.

Figure 14:
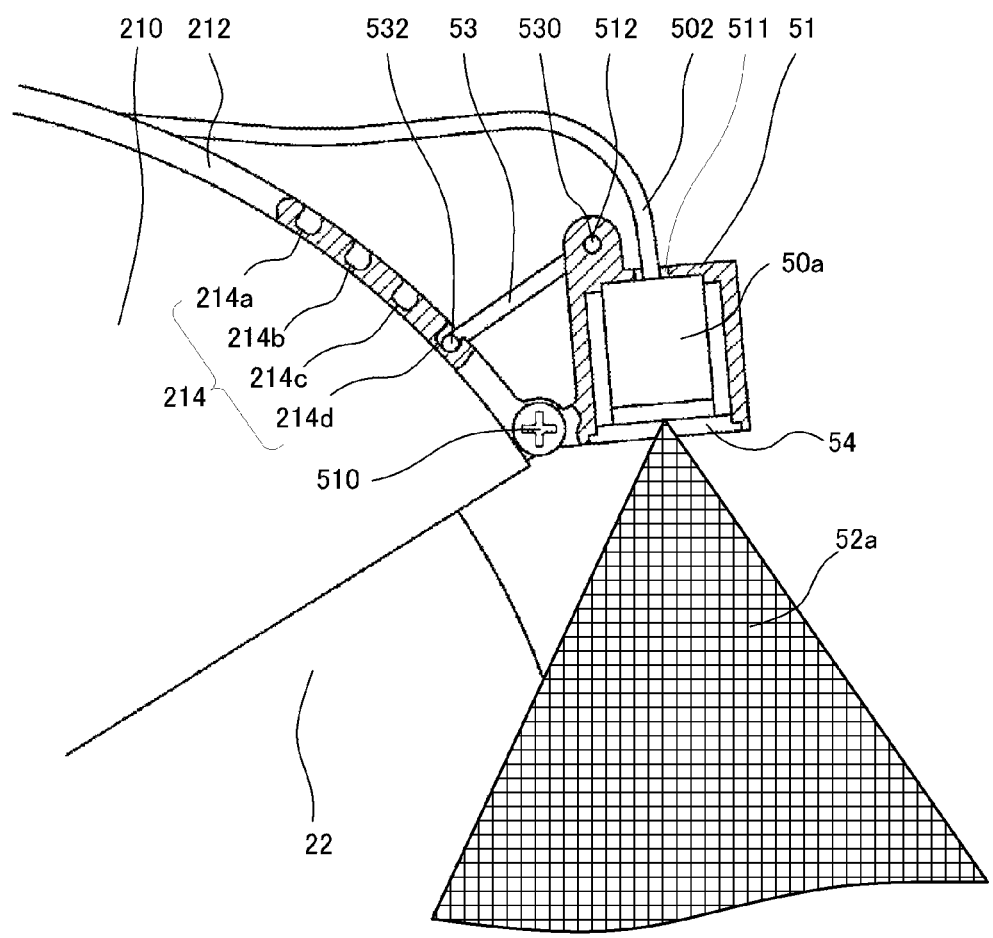
FIG. 14 is a cross-sectional enlarged view illustrating the light-emitting unit of the motorized cutter depicted in FIG. 12.

Next, an explanation is given of a method for pivoting and fixing the light-emitting unit 50*a* with reference to FIGS. 13 and 14.

The angle of the light-emitting unit 50*a* can be changed by pivoting the light-emitting unit 50*a* about the axis of the screw 510. This in turn changes the angle of illumination of the laser light 52*a*. The angle of pivot of the light-emitting unit 50*a* is fixed by engaging the rear end 532 of the hook section 53, connected to the engaging hole 512 of the case 51, and one of the engaging grooves 214.

For example, as illustrated in FIG. 13, when the rear end 532 of the hook section 53 engages with the engaging hole 214*a* on the rear side of the wheel guard 210, the light-emitting unit 50*a* connected to the front end 530 of the hook section 53 is fixed inclined to the rear centered about the screw 510. The laser light 52*a* is therefore emitted to the front side.

On the other hand, as illustrated in FIG. 14, when the rear end 532 of the hook section 53 engages with the engaging hole 214*d* on the front side of the wheel guard 210, the light-emitting unit 50*a* connected to the front end 530 of the hook section 53 is fixed inclined to the front centered about the screw 510. The laser light 52*a* is therefore emitted to the rear side, compared with when the rear end 532 of the hook section 53 engages with the engaging hole 214*a* on the rear side of the wheel guard 210 as illustrated in FIG. 13. In this manner, it is possible to adjust the angle of the laser light 52*a* emitted by the light-emitting unit 50*a*. In the same manner, it is possible to adjust the angle of the laser light 52*b* emitted by the light-emitting unit 50*b*.

Figure 15:
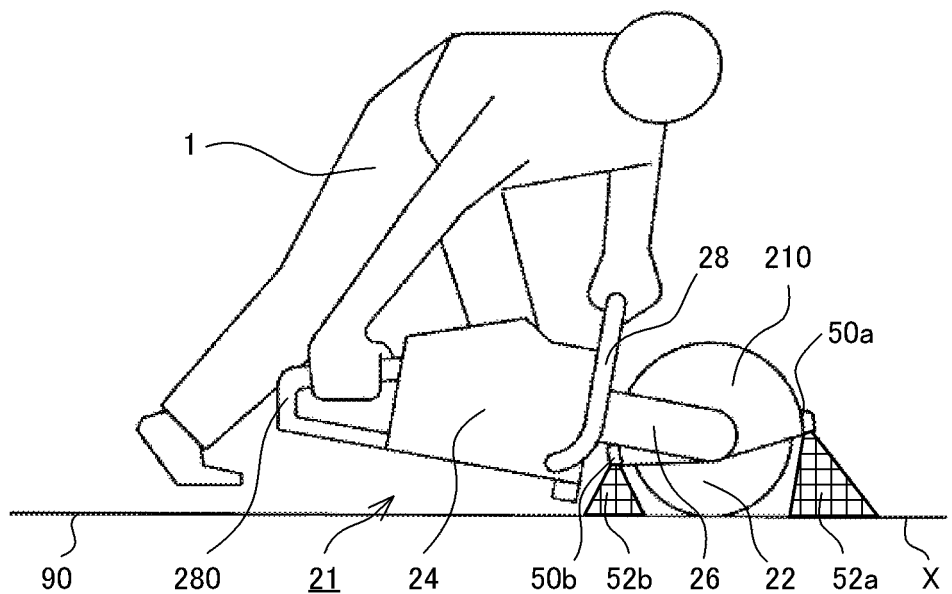
FIG. 15 is a schematic view illustrating the motorized cutter depicted in FIG. 12 cutting a roadbed.
Figure 16:
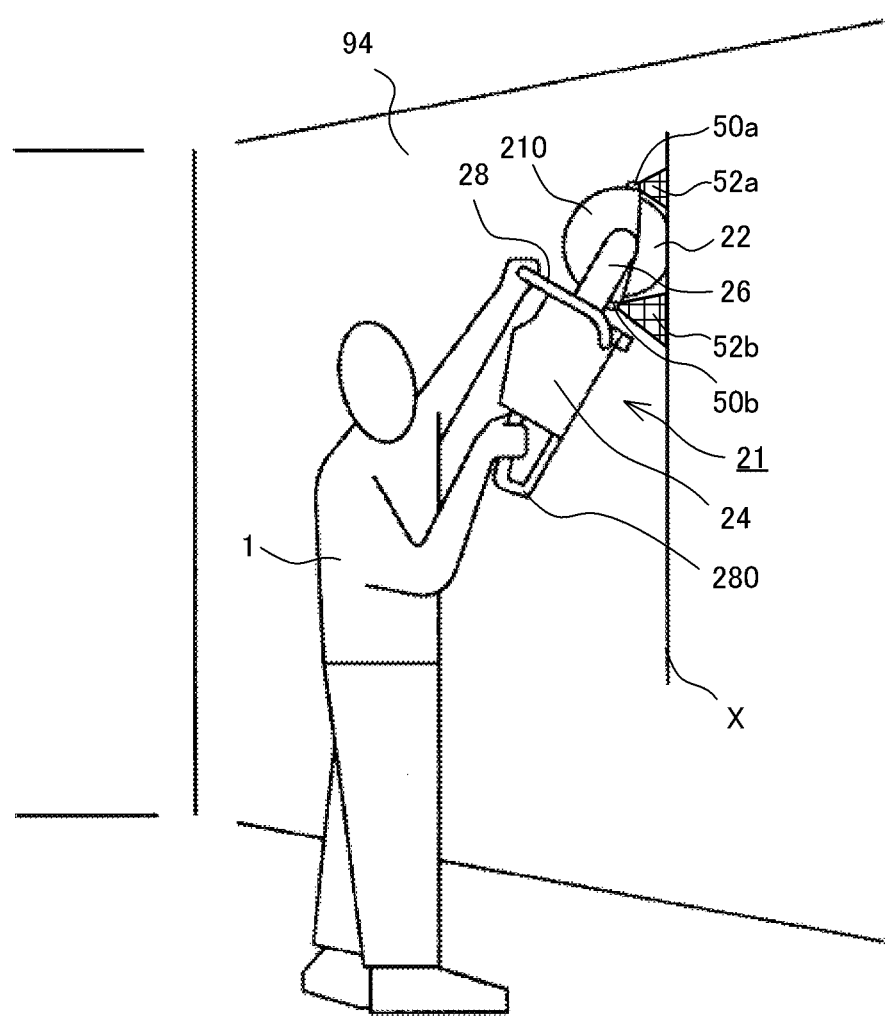
FIG. 16 is a schematic view illustrating the motorized cutter depicted in FIG. 12 cutting a wall surface.
Figure 17:
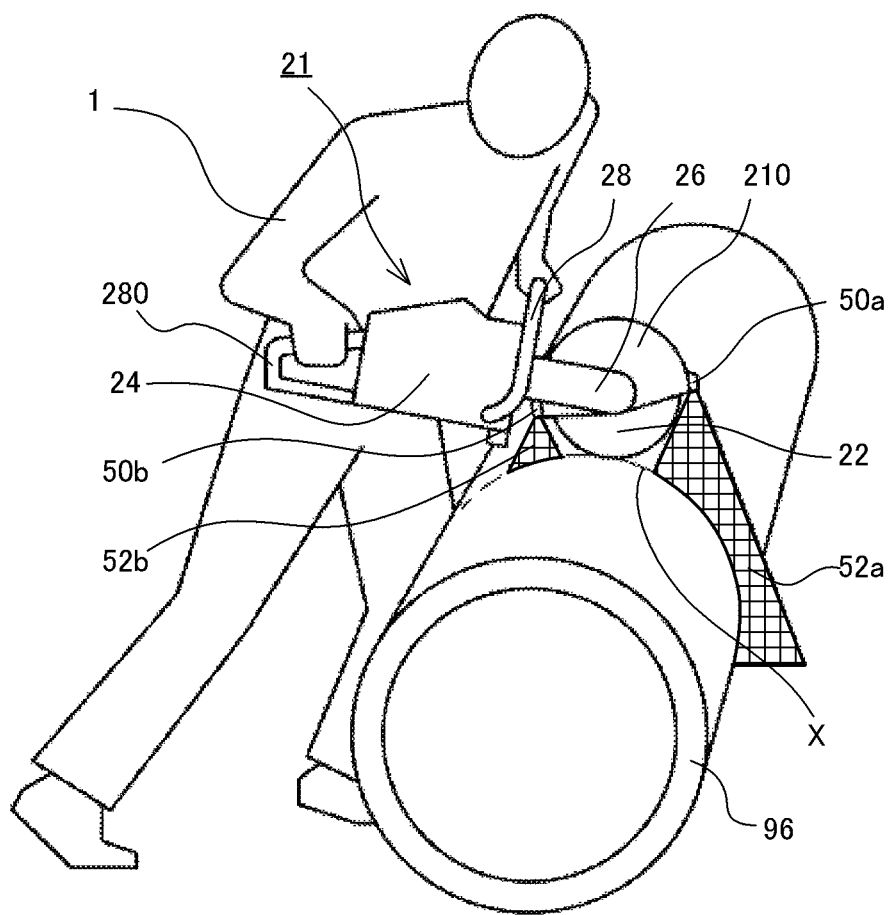
FIG. 17 is a schematic view illustrating the motorized cutter depicted in FIG. 12 cutting a pipe material.

The motorized cutter 21 of this embodiment is applicable not only to the cutting of the plate material 92 illustrated in FIG. 12 but also to the cutting of the roadbed 90 illustrated in FIG. 15, a wall surface 94 illustrated in FIG. 16, or pipe material 96 illustrated in FIG. 17, etc.

First, an explanation is given of cutting of the roadbed 90 with reference to FIG. 15. In this case, it is unavoidable for an operator 1 to carry out cutting in a half-sitting posture. Even in such a case, because the laser lights 52*a* and 52*b* of the light-emitting units 50*a* and 50*b* irradiate the front and the rear of the blade 22, it is easy to align the blade 22 and the line X and perform a prompt cutting.

Next, an explanation is given of cutting of the wall surface 94 with reference to FIG. 15. The operator 1 holds the front handle 28 and the rear handle 280 of the motorized cutter 21. Next, the operator 1 adjusts the position and orientation of the motorized cutter 21 so that the laser light 52*b* emitted by the rear light-emitting unit 50*b* is lined up with the line X drawn on the wall surface 94. Next, the operator 1 performs cutting by pressing the motorized cutter 21 against the wall surface 94 and pulling the motorized cutter 21 downwards while confirming that the laser light 52*b* is positioned on the line X. It is possible then to cut the wall surface 94 along the line X. Additionally, by pivoting the upper light-emitting unit 50*a* upwards so that the laser light 52*a* is emitted further upwards, it is possible to easily visually check alignment of the laser light 52*a* and the line X. It is then also possible to carry out cutting by pressing the motorized cutter 21 upwards.

Next, an explanation is given of cutting of the pipe material 96 with reference to FIG. 17. In this event, because the surface of the pipe material 96 to be cut is curved, there is a case where the laser lights 52*a* and 52*b* emitted from the light-emitting units 50*a* and 50*b* extrudes over the pipe material 96. At this case, by changing the angle of the light-emitting units 50*a* and 50*b* before cutting so that the light-emitting units 50*a* and 50*b* incline in the direction of the pipe material 96, it is possible to irradiate the line X of the pipe material 96 with the laser lights 52*a* and 52*b* appropriately and perform a superior cutting.

The structure enabling the light-emitting units 50*a* and 50*b* to be pivotably supported at the wheel guard 210 for the motorized cutter 21 of this embodiment is not limited to the structure using the screw 510, the hook section 53 and the engaging grooves 214 and the adoption of various structures is possible. For example, it is also possible to adopt a structure where, rather than using the hook section 53 and the engaging groove 214, using a taper screw as the screw 510, the light-emitting units 50*a* and 50*b* are fixed by fastening the screw 510, and the light-emitting units 50*a* and 50*b* are enabled to be pivoted by loosening the screw 510.

By using the motorized cutter 21 as a single unit as illustrated in this embodiment, it is possible to easily perform cutting in small spaces or at locations where it is difficult to bring the carriage 30.

The motorized cutter 21 of this embodiment is not limited to use as a single unit and can also be used attached to the carriage 30 as with the motorized cutter 20 of the first to third embodiments.

Fifth Embodiment

Figure 18:
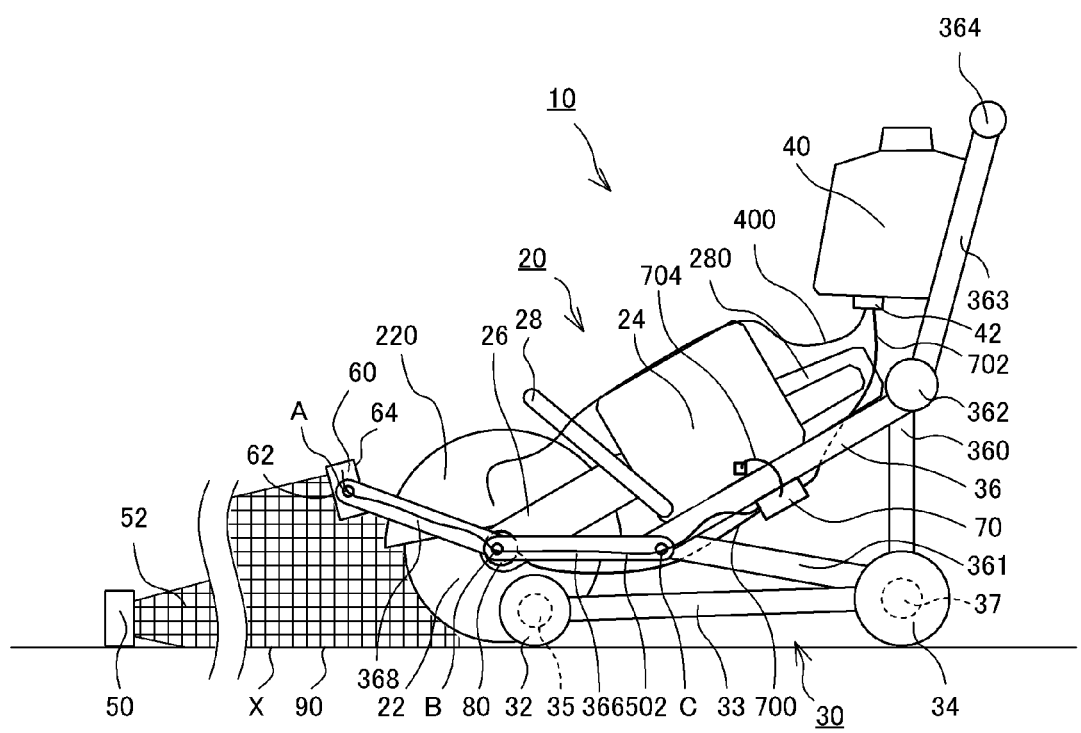
FIG. 18 is a side view illustrating a motorized cutter with wheels of a fifth embodiment.
Figure 19:
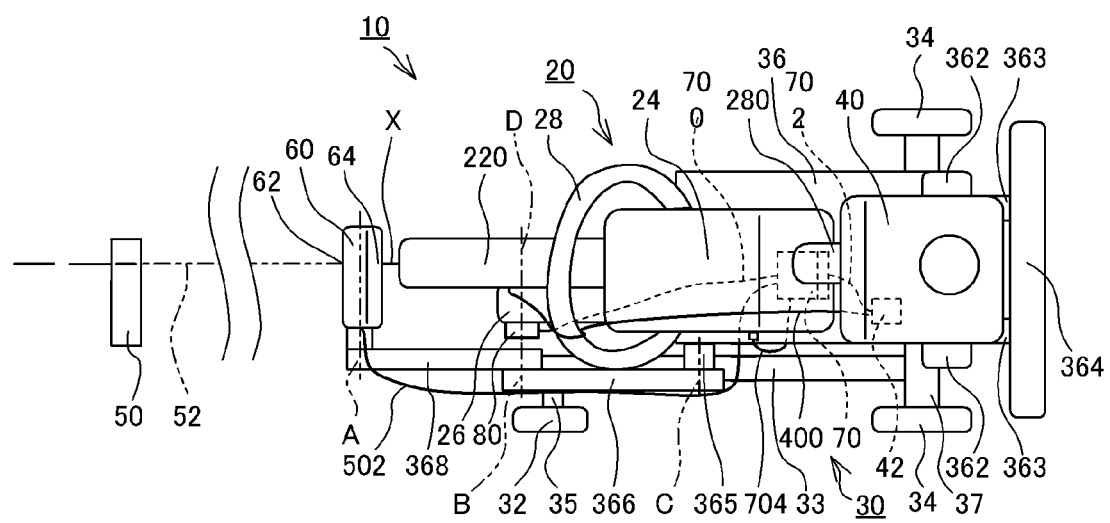
FIG. 19 is a plan view illustrating the motorized cutter with wheels depicted in FIG. 18.

Further, rather than using the motorized cutter with wheels 10 and the cutting method of the second embodiment, it is also possible to arrange a light emitter 50 on the roadbed 90 and provide the photoreceiver 60 at the motorized cutter with wheels 10 as depicted in FIGS. 18 and 19. The light emitter 50 is arranged on the roadbed 90 so that the laser light 52 emitted by the light emitter 50 is lined up with the line X drawn on the roadbed 90. The photoreceiver 60 is provided at the carriage 30 of the motorized cutter with wheels 10 so that the detection unit 62 of the photoreceiver 60 detects a position of the laser light 52 incident substantially perpendicularly to the axis of rotating shaft D with respect to the blade 22 in the axial direction of the rotating shaft D. It is therefore possible to cut the roadbed 90 along the line X as in the second embodiment by operating the motorized cutter with wheels 10 while watching the display LEDs 64*a*, 64*b*, and 64*c* of the display unit 64 so that the photodiodes 62*b* of the detection unit 62 is irradiated with the laser light 52. It is preferable for the photoreceiver 60 of this embodiment to be provided with the display unit 64 in the opposite surface to the detection unit 62 so that the operator can watch the display unit 64 while cutting. It is also possible for the photoreceiver 60 to be provided at the motorized cutter 20 or 21.

It is also possible for the detection unit 62 and the display unit 64 of the photoreceiver 60 to be separated and electrically connected by cable or the like so that the display unit 64 can be provided at a location such as at the arm 366, arm 368, or at the handle 364 that is appropriate for being confirmed by the operator.

According to the motorized cutter with wheels 10 and the motorized cutters 20 and 21 of the above embodiments, it is possible to adjust the cutting direction of the blade 22 using the laser light 52 instead of using a marker plate for damage and veering due to bumps in the roadbed 90 etc. It is also possible to accurately cut the work material in line with the line X even when viewing the laser light 52 at an angle. It is therefore possible to implement highly reliable cutting where the ease of operation of the motorized cutter with wheels 10 and the motorized cutters 20 and 21 is superior.

It is also possible to adjust the plane of irradiation of the laser light 52 and the blade 22 to be on the same straight line by irradiating the blade 22 exposed from the open section 224 with the laser light 52. The open section 224 is covered with the cover 222 after completing adjustment of the irradiation position of the laser light 52. It is therefore possible to prevent cutting fluid, chips, and pieces of the blade 22 resulting from damage during cutting from flying off from the open section 224 when cutting the roadbed 90.

It is also possible to change the direction of the laser light 52 according to the state of the work material by pivotably installing the light-emitting unit 50. The operations of aligning the plane of irradiation of the laser light 52 and the blade 22 and of aligning the line X and the laser light 52 are therefore simplified and can be performed rapidly which improves ease of operation. It is also possible for the light-emitting unit 50 to emit the laser light 52 far into the distance by changing the angle of the light-emitting unit 50 for long lines X and the degree of freedom for setting the cutting position can therefore be enhanced.

It is also straightforward to change the height of the light-emitting unit 50 and to which the light-emitting unit 50 projects towards the front by installing the arm 368 supporting the light-emitting unit 50 pivotably. It is also possible to store the motorized cutter with wheels 10 in a compact manner by pivoting the light-emitting unit 50 to the side of the motorized cutter 20 when not in use.

The operating time of the light-emitting unit 50 can be extended by supplying electrical power for the light-emitting unit 50 from the engine 24 via the engine generator 27. This also improves usefulness as any other power supply is not necessary.

The control unit 70 supplies electrical power to the light-emitting unit 50 in response to the operation of the engine 24. The light-emitting unit 50 can therefore automatically emit the laser light 52.

The control unit 70 controls the solenoid valve 42 connected to the tank 40 in response to the rotation of the blade 22. Cutting fluid is therefore supplied and stopped automatically in response to the rotation of the blade. This improves the ease of operation of the motorized cutter with wheels 10.

It is also possible to accurately adjust the position and orientation of the motorized cutter with wheels 10 with respect to the line X by arranging the photoreceiver 60 on the line X and confirming the display unit 64 of the photoreceiver 60 even when visual confirmation of the line X is difficult due to poor posture or due to sparks and dust created by the work material and blade 22, and even when the laser light 52 is in a distant position or bright environment that cannot be easily be confirmed by the naked eye.

Modified Example

Figure 21:
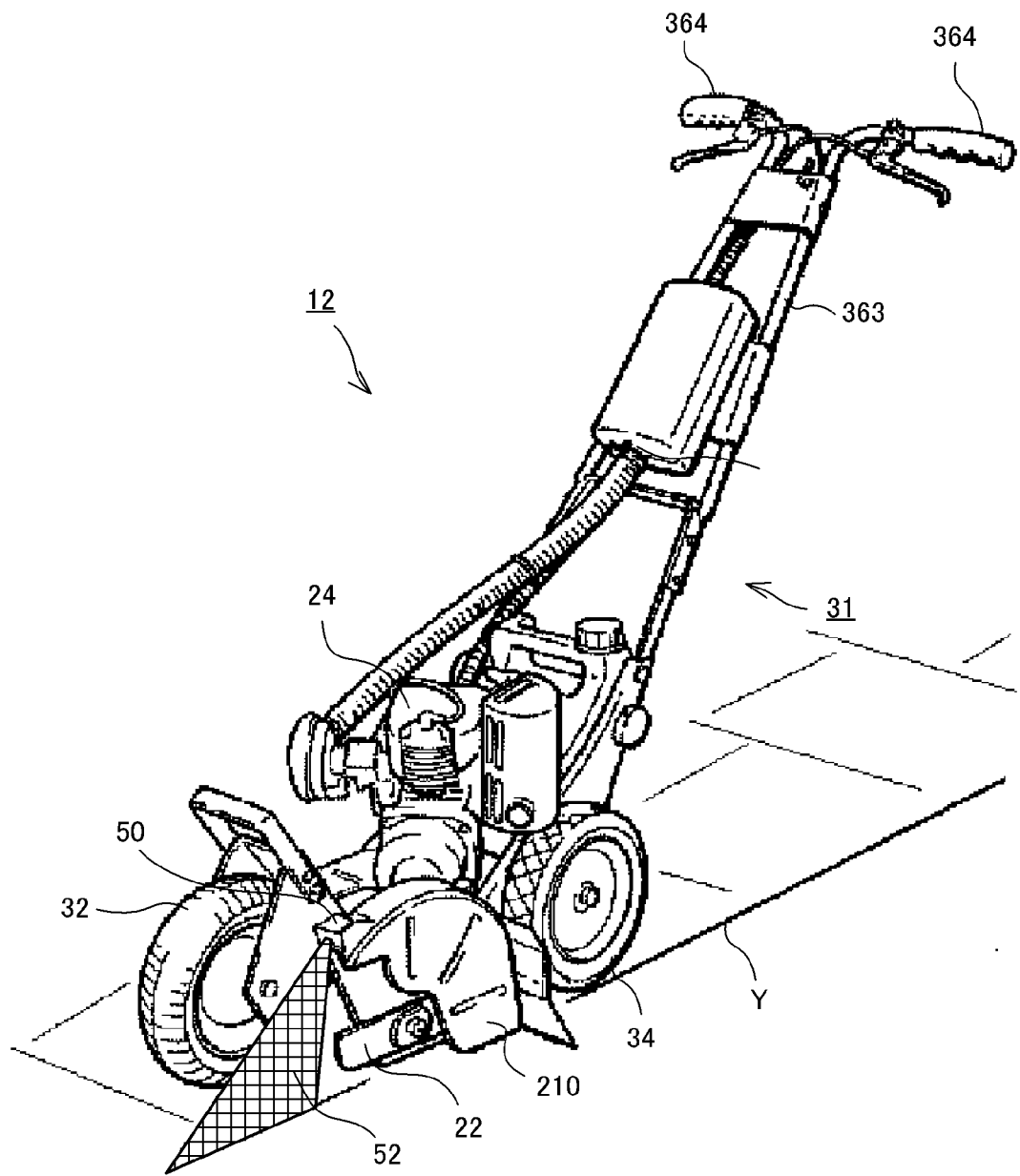
FIG. 21 is a perspective view illustrating a motorized cutter with wheels of a modified example of the embodiments.
Figure 22:
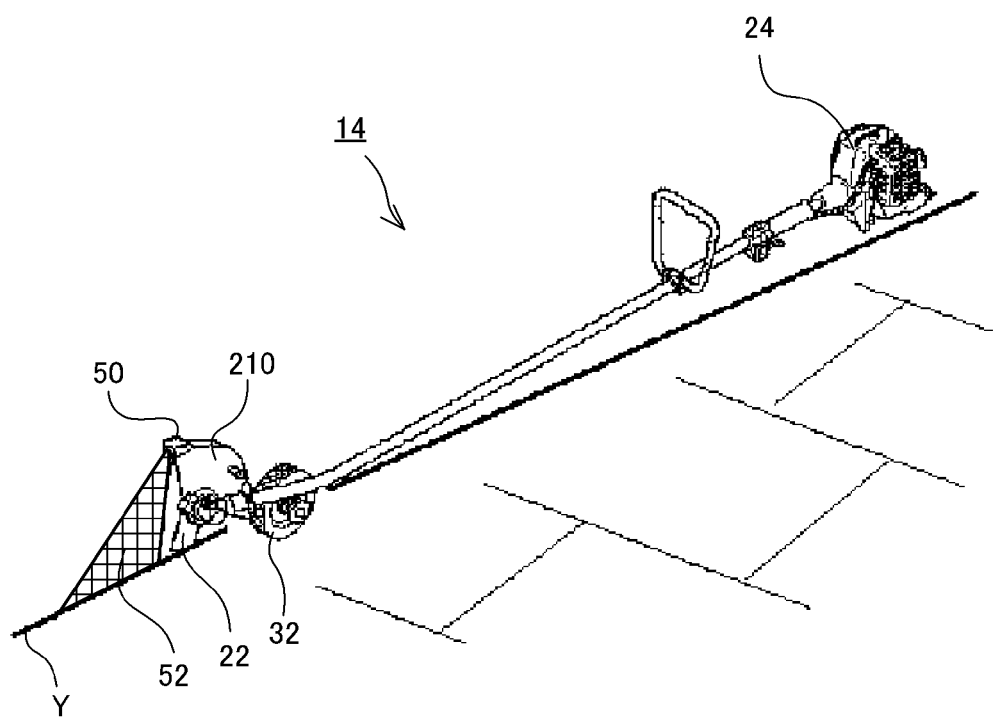
FIG. 22 is a perspective view illustrating a motorized cutter of a modified example of the embodiments.

An explanation is given in the above of the motorized cutter with wheels 10 and the motorized cutters 20 and 21 of the embodiments of the present invention but various modifications are possible. For example, in the above explanation, the motorized cutter with wheels 10 and the motorized cutters 20 and 21 of the above embodiments rotate a disc-shaped blade 22 and cut the roadbed 90, the plate material 92, the wall surface 94, and the pipe material 96 etc. However, the present invention can also be applied to a motorized cutter with wheels 12 and a motorized cutter 14 for cutting turf as depicted in, for example, FIGS. 21 and 22. The motorized cutter with wheels 12 and the motorized cutter 14 are typically referred to as "edgers" and are motorized tools for trimming edges such as a border between stone paving and a lawn surface or a border between a flower bed and a lawn surface. The motorized cutter with wheels 12 is a type where the engine 24 and the blade 22 are mounted on a carriage 31 with front wheels 32 and 34, and the motorized cutter 14 is a type where the operator supports the engine 24.

The configuration where the motorized cutters 20 and 21 of the first to fourth embodiments are supplied with electrical power for the light-emitting unit 50 by the engine generator 27 that generates electrical power from the power of the engine 24 and can also be such that the electrical power is supplied by dry batteries (not shown). This means that it is also possible to emit the laser light 52 when the engine 24 is not operating. This improves operability when the laser light 52 is turned on and off frequently. As illustrated in FIG. 18, it is also possible for the electrical power for the light-emitting unit 50 to be supplied from the battery 49 that stores electrical power generated by the engine generator 27. The battery 49 is then charged by a charging circuit 494 connected to the primary coil 272 of the engine generator 27 via a cable 492 in accompaniment with the operation of the engine 24. This makes it possible to supply more electrical power when electrical components are mounted in addition to the light-emitting unit 50.

An explanation is given where the second rotation sensor 80 is used as the second sensor for detecting rotation of the blade 22 but it is also possible to use a displacement sensor 82 etc. that detects an extent of opening of the throttle lever 369, as depicted in FIG. 3. In this case, when the throttle lever 369 is pulled as far as the position where rotation of the blade 22 starts, the displacement sensor 82 detects displacement of the throttle lever 369 and a displacement detection signal S3 indicating the displacement of the throttle lever 369 is sent to the control unit 70 via a cable 820. Upon receiving the displacement detection signal S3, the control unit 70 instructs the solenoid valve 42 to start operation via the cable 702. The cutting fluid is then sent from the tank 40 to the blade 22 via the tube 400 in accompaniment with the opening of the solenoid valve 42. It is therefore possible to obtain the same results as for the second rotation sensor 80 by installing the displacement sensor 82.

Further, an explanation is given using rubber pads as members for suppressing vibration of the light-emitting unit 50 or the photoreceiver 60 of the above embodiments but this is by no means limiting and resilient members such as springs can also be used. It is also possible to suppress vibration of the laser light 52 for the motorized cutter with wheels 10 of the first to third embodiments by locating the light-emitting unit 50 close to the work material that is the subject of illumination by the laser light 52.

The laser light 52 can be emitted continuously or can be emitted as a result of being subjected to prescribed modulation in order to discriminate between the laser light 52 and external light when the photoreceiver 60 is used. It is also preferable for the color of the laser light 52 to be green to enable straightforward discrimination by the naked eye when irradiated continuously and this color may be red, green, or another color when the photoreceiver 60 is used.

It is also possible for the detection unit 62 of the photoreceiver 60 and the light emitter 50 to be located on a straight line parallel with the desired direction of cutting without having to be located on the line X.

The tank 40, the solenoid valve 42, and the tube 400 are not necessary when, for example, a dry wheel is used as the blade 22 for the motorized cutter 20.

An explanation is also given where the motorized cutter with wheels 10 of the above embodiments is provided with one front wheel 32 for the carriages 30 and 31 in order to emphasize ease of operation but it is also possible to provide a plurality of front wheels 32 to give stability to the carriages 30 and 31.

In the above embodiments, an explanation is given using the engine 24 as a driving unit for driving the blade 22 but, for example, an electric motor or a hydraulic motor is also possible providing the output is of a sufficient order to be capable of cutting paving material of the roadbed 90.

Having described and illustrated the principles of this application by reference to preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

This application claims priority based on Japanese Patent Application No. 2009-018864 filed on Jan. 29, 2009, the entire disclosure of which is incorporated herein by reference in its entirety.

REFERENCE SIGNS LIST

10, 12 Motorized cutter with wheels
14, 20, 21 Motorized cutter
22 Blade
210, 220 Wheel guard (Protective unit)
222 Cover
224 Open section
24 Engine
26 Support flame
27 Engine generator (generator)
30, 31 Carriage
36 Pedestal
364 Handle
366, 368 Arm
40 Tank
42 Solenoid valve (On-off valve)
49 Battery
50, 50*a*, 50*b* Light-emitting unit/Light emitter
500 First rotation sensor (First sensor)
52, 52*a*, 52*b* Laser light
60 Photoreceiver
62 Detection unit
64 Display unit
70 Control unit (First and second control units)
80 Second rotation sensor (Second sensor)
82 Displacement sensor (Second sensor)
X Line

The invention claimed is:

1. A motorized cutter with wheels comprising:
   a hand-held engine;
   a blade, rotatably driven by the hand-held engine, for cutting a work material; and
   a carriage which has a plurality of wheels, and on which the hand-held engine is attachably and detachably mounted,
   wherein the carriage has at least one light-emitting unit for emitting laser light traveling substantially perpendicularly to a direction of an axis of rotation of the blade, and
   an illumination plane formed by the laser light emitted from the at least one light-emitting unit is finely-adjustable in a direction perpendicular to a direction of travel of the carriage.

2. The motorized cutter with wheels according to claim 1, further comprising a support member for supporting the light-emitting unit pivotably about an axis parallel with the axis of rotation of the blade.

3. The motorized cutter with wheels according to claim 1, further comprising a support member for supporting the light-emitting unit pivotably about an axis parallel with the axis of rotation of the blade and movably in parallel with the axis of rotation of the blade.

4. The motorized cutter with wheels according to claim 3, further comprising a protective unit for covering the blade,
   wherein an open section is formed at the protective unit so as to enable the light-emitting unit to irradiate the blade with the laser light via the open section.

5. The motorized cutter with wheels according to claim 4, wherein the protective unit comprises a cover for covering the open section.

6. The motorized cutter with wheels according to claim 1, wherein the at least one light-emitting unit comprises a plurality of the light-emitting units emitting the laser light to the front and rear of the blade.

7. The motorized cutter with wheels according to claim 1, further comprising a generator for generating electrical power from the power of the engine,
   wherein the light-emitting unit operates on the electrical power supplied by the generator.

8. The motorized cutter with wheels according to claim 7, further comprising a battery for storing the electrical power supplied by the generator,
   wherein the light-emitting unit operates on the electrical power supplied by the battery.

9. The motorized cutter with wheels according to claim 1, further comprising:
   a sensor for detecting rotation of the engine and transmitting an engine rotation detection signal for indicating whether or not the engine is rotating; and
   a control unit for controlling whether the light-emitting unit is on or off in response to the engine rotation detection signal received from the sensor,
   wherein the control unit puts the light-emitting unit on in response to starting of the engine and puts the light-emitting unit off in response to stopping of the engine.

10. The motorized cutter with wheels according to claim 1, further comprising:
    a tank for storing cutting fluid supplied to the blade;
    a supply path for supplying the cutting fluid from the tank to the blade;
    an on-off valve for opening and closing the supply path;

a sensor for detecting rotation of the blade and transmitting a blade rotation detection signal indicating whether or not the blade is rotating; and a control unit for controlling whether the on-off valve is on or off in response to the blade rotation detection signal received from the sensor, wherein the control unit puts the on-off valve on in response to starting of the blade and puts the on-off valve off in response to stopping of the blade.

11. The motorized cutter with wheels according to claim 1, wherein the light-emitting unit is provided at the same surface as the rotating surface of the blade.

12. The motorized cutter with wheels according to claim 1, wherein the hand-held engine is mounted on the carriage pivotably about an axis of a rear side axle.

13. The motorized cutter with wheels according to claim 1, wherein the light-emitting unit is connected with the hand-held engine via an elastic member.

14. The motorized cutter with wheels according to claim 1, further comprising a support member for supporting the light-emitting unit movably in parallel with the axis of rotation of the blade.

15. A motorized cutter with wheels comprising:

a hand-held engine;

a blade, rotatably driven by the hand-held engine, for cutting a work material; and a carriage which has a plurality of wheels, and on which the hand-held engine is attachably and detachably mounted, wherein the carriage has a detection unit for detecting a position of laser light incident substantially perpendicularly to a direction of an axis of rotation of the blade with respect to a position of the blade in the direction of the axis of rotation of the blade and a display unit for displaying the position of the laser light detected by the detection unit.

* * * * *